US009173039B2

(12) United States Patent
Iwamoto et al.

(10) Patent No.: US 9,173,039 B2
(45) Date of Patent: Oct. 27, 2015

(54) OPTICAL MICROPHONE

(71) Applicants: Takuya Iwamoto, Osaka (JP); Masahiko Hashimoto, Osaka (JP); Ushio Sangawa, Nara (JP); Yuriko Kaneko, Nara (JP)

(72) Inventors: Takuya Iwamoto, Osaka (JP); Masahiko Hashimoto, Osaka (JP); Ushio Sangawa, Nara (JP); Yuriko Kaneko, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 132 days.

(21) Appl. No.: 14/062,517

(22) Filed: Oct. 24, 2013

(65) Prior Publication Data

US 2014/0050489 A1 Feb. 20, 2014

Related U.S. Application Data

(63) Continuation of application No. PCT/JP2012/005146, filed on Aug. 13, 2012.

(30) Foreign Application Priority Data

Aug. 25, 2011 (JP) ................................ 2011-183990

(51) Int. Cl.
*H04B 10/02* (2006.01)
*H04B 10/12* (2006.01)
(Continued)

(52) U.S. Cl.
CPC ................ *H04R 23/008* (2013.01); *H04R 1/34* (2013.01)

(58) Field of Classification Search
CPC .................................................. H04R 23/008
USPC ................................................ 398/133, 113
See application file for complete search history.

(56) References Cited

U.S. PATENT DOCUMENTS 5,910,855 A * 6/1999 Thomas ........................ 359/285
7,277,642 B2 * 10/2007 Shinzou ........................ 398/133
7,668,325 B2 * 2/2010 Puria et al. .................... 381/322
(Continued)

FOREIGN PATENT DOCUMENTS

JP 60-018100 A 1/1985
JP 08-265262 A 10/1996
(Continued)

OTHER PUBLICATIONS

International Search Report for corresponding International Application No. PCT/JP2012/005146, mailed Nov. 20, 2012.

*Primary Examiner* — Ken Vanderpuye
*Assistant Examiner* — Abbas H Alagheband
(74) *Attorney, Agent, or Firm* — Renner, Otto, Boisselle & Sklar, LLP

(57) ABSTRACT

An optical microphone for detecting an acoustic wave propagating through an environmental fluid by using a light wave, includes: an acoustic wave receiving section having a propagation medium portion through which an acoustic wave propagate and a first support portion for supporting the propagation medium portion; a light source for outputting a light wave so that the light wave passes through the propagation medium portion across the acoustic wave propagating through the propagation medium portion; a light-blocking portion having an edge line for splitting the light wave having passed through the propagation medium portion into a blocked portion and a non-blocked portion; and a photoelectric conversion section for receiving a portion of the light wave having passed through the propagation medium portion which has not been blocked by the light-blocking portion to output an electric signal.

19 Claims, 24 Drawing Sheets

(51) Int. Cl.
*H04R 23/00* (2006.01)
*H04R 1/34* (2006.01)

(56) References Cited

U.S. PATENT DOCUMENTS

| | | | | |
|---|---|---|---|---|
| 8,290,316 | B2 * | 10/2012 | Molin et al. | 385/12 |
| 8,295,523 | B2 * | 10/2012 | Fay et al. | 381/328 |
| 8,306,429 | B2 * | 11/2012 | Hashimoto et al. | 398/132 |
| 8,391,517 | B2 * | 3/2013 | Avenson et al. | 381/172 |
| 8,488,973 | B2 * | 7/2013 | Avenson et al. | 398/133 |
| 8,542,956 | B2 * | 9/2013 | Akkaya et al. | 385/12 |
| 8,594,507 | B2 * | 11/2013 | Youngner et al. | 398/132 |
| 2001/0042816 | A1 * | 11/2001 | Fujimoto et al. | 250/201.2 |
| 2002/0139066 | A1 * | 10/2002 | Szymanski et al. | 52/145 |
| 2005/0139013 | A1 * | 6/2005 | Hashimoto et al. | 73/861.27 |
| 2006/0192976 | A1 * | 8/2006 | Hall et al. | 356/505 |
| 2006/0251278 | A1 * | 11/2006 | Puria et al. | 381/312 |
| 2007/0165896 | A1 * | 7/2007 | Miles et al. | 381/356 |
| 2009/0092271 | A1 * | 4/2009 | Fay et al. | 381/328 |
| 2010/0139405 | A1 * | 6/2010 | Melikechi et al. | 73/655 |
| 2010/0180693 | A1 * | 7/2010 | Nagahara et al. | 73/861.27 |
| 2010/0209471 | A1 * | 8/2010 | Weber | 424/423 |
| 2011/0029041 | A1 * | 2/2011 | Wiskerke | 607/57 |
| 2011/0123199 | A1 * | 5/2011 | Hashimoto et al. | 398/134 |
| 2011/0170117 | A1 * | 7/2011 | Fischer | 356/519 |
| 2011/0194857 | A1 * | 8/2011 | Avenson et al. | 398/133 |
| 2012/0204649 | A1 * | 8/2012 | Iwamoto et al. | 73/643 |
| 2012/0307257 | A1 * | 12/2012 | Yoshii et al. | 356/479 |
| 2014/0153930 | A1 * | 6/2014 | Fischer | 398/133 |

FOREIGN PATENT DOCUMENTS

| | | |
|---|---|---|
| JP | 2009-085868 A | 4/2009 |
| WO | WO 2010/029509 | 3/2010 |
| WO | WO 2011/083760 | 7/2011 |

* cited by examiner

OPTICAL MICROPHONE

This is a continuation of International Application No. PCT/JP2012/005146, with an international filing date of Aug. 13, 2012, which claims priority of Japanese Patent Application No. 2011-183990, filed on Aug. 25, 2011, the contents of which are hereby incorporated by reference.

BACKGROUND OF THE INVENTION

1. Technical Field

The present application relates to an optical microphone for receiving an acoustic wave propagating through a gas such as the air and converting the received acoustic wave to an electric signal by using light.

2. Description of the Related Art

Microphones are known in the art as a device for receiving an acoustic wave and converting the acoustic wave into an electric signal. Many microphones, such as dynamic microphones and condenser microphones, include a diaphragm. With these microphones, a sound wave is received as the sound wave vibrates the diaphragm, and the vibration is taken out as an electric signal. A microphone of this type includes a mechanical vibrating section, such as a diaphragm, and properties of the mechanical vibrating section may possibly change as the microphone is used many times repeatedly. When detecting a very strong sound wave with a microphone, the mechanical vibrating section may possibly break.

In order to solve such problems of a conventional microphone having a mechanical vibrating section, Japanese Laid-Open Patent Publication No. 8-265262 (hereinafter, referred to as Patent Document No. 1) and Japanese Laid-Open Patent Publication No. 2009-085868 (hereinafter, referred to as Patent Document No. 2), for example, disclose optical microphones that do not have a mechanical vibrating section and that detect an acoustic wave by utilizing a light wave.

For example, Patent Document No. 1 discloses a method for detecting an acoustic wave by modulating light with an acoustic wave and detecting the modulated component of the light. Specifically, as shown in FIG. 36, a laser beam, which has been shaped using a light-outputting optical component 111, is made to act upon an acoustic wave 1 propagating through the air, thereby producing diffracted light. In this process, two diffracted light components in reverse phase are produced. After adjusting the diffracted light by a light-receiving optical component 112, only one of the two diffracted light components is received by an optical diode 113 and converted to an electric signal, thereby detecting the acoustic wave 1.

Patent Document No. 2 discloses a method for detecting an acoustic wave by propagating an acoustic wave through a medium and detecting changes in optical properties of the medium. As shown in FIG. 37, an acoustic wave 5 propagating through the air is taken in through an opening 201, and travels through an acoustic waveguide 202, of which at least a portion of the wall surface is formed by a photoacoustic propagation medium 203. The sound wave traveling through the acoustic waveguide 202 is taken in by the photoacoustic propagation medium 203 and propagates through the inside thereof. The photoacoustic propagation medium 203 undergoes a refractive index change as the sound wave propagates therethrough. The acoustic wave 5 is detected by extracting this refractive index change as an optical modulation by using a laser Doppler vibrometer 204. Patent Document No. 2 discloses that by using a dry silica gel as the photoacoustic propagation medium 203, the acoustic wave in the waveguide can be efficiently taken in into the inside of the photoacoustic propagation medium 203.

SUMMARY OF THE INVENTION

With the conventional technique described above, however, the device is large in size and the detection sensitivity is not sufficiently high. A non-limiting example embodiment of the present application provides an optical microphone that is small in size and has a high detection sensitivity.

In order to solve the problems set forth above, one aspect of the present invention is directed to an optical microphone for detecting an acoustic wave propagating through an environmental fluid by using a light wave, the optical microphone including: an acoustic wave receiving section including a propagation medium portion and a first support portion, wherein the propagation medium portion is formed by a solid propagation medium, has an incidence surface through which the acoustic wave enters, and allows the acoustic wave having entered through the incidence surface to propagate therethrough, and the first support portion has an opening for the acoustic wave and supports the propagation medium portion so that the incidence surface is exposed through the opening; a light source for outputting a light wave so that the light wave passes through the propagation medium portion across the acoustic wave propagating through the propagation medium portion; a light-blocking portion having an edge line parallel to the incidence surface of the propagation medium portion for splitting the light wave having passed through the propagation medium portion into a blocked portion and a non-blocked portion; and a photoelectric conversion section for receiving a portion of the light wave having passed through the propagation medium portion which has not been blocked by the light-blocking portion to output an electric signal.

The general and specific aspects set forth above can be implemented using a system, a method and a computer program, or realized by using a combination of a system, a method and a computer program.

With an optical microphone according to one aspect of the present invention, an acoustic wave is allowed to enter a solid propagation medium, and the acoustic wave is detected by allowing an interaction between a light wave and the acoustic wave, thereby suppressing the influence of the convection of the air, or the like. Since the propagation medium is a solid, the change in refractive index caused by the propagation of the acoustic wave through the propagation medium portion is increased, thereby making it possible to detect the acoustic wave with a high sensitivity.

Since the modulated component modulated by the acoustic wave is detected as an interference component between a $0^{th}$-order diffracted light wave and a $+1^{st}$-order diffracted light wave or a $-1^{st}$-order diffracted light wave, the change in the amount of light of the interference component corresponds to the acoustic wave to be detected. Therefore, without using a large-scale optical system such as a laser Doppler vibrometer, it is possible to detect the interference component using a simple photoelectric conversion element. Therefore, the configuration of the optical microphone can be made small and simple.

Moreover, by utilizing diffraction of a light wave caused by an acoustic wave and defining the blocking direction based on the arrangement of the light-blocking portion or the photoelectric conversion section, it is possible to obtain an acoustic wave of an intended propagation direction, and it is therefore possible to reduce the influence of the sound diffraction or leaking waves.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION OF PREFERRED EMBODIMENTS

Figure 1:
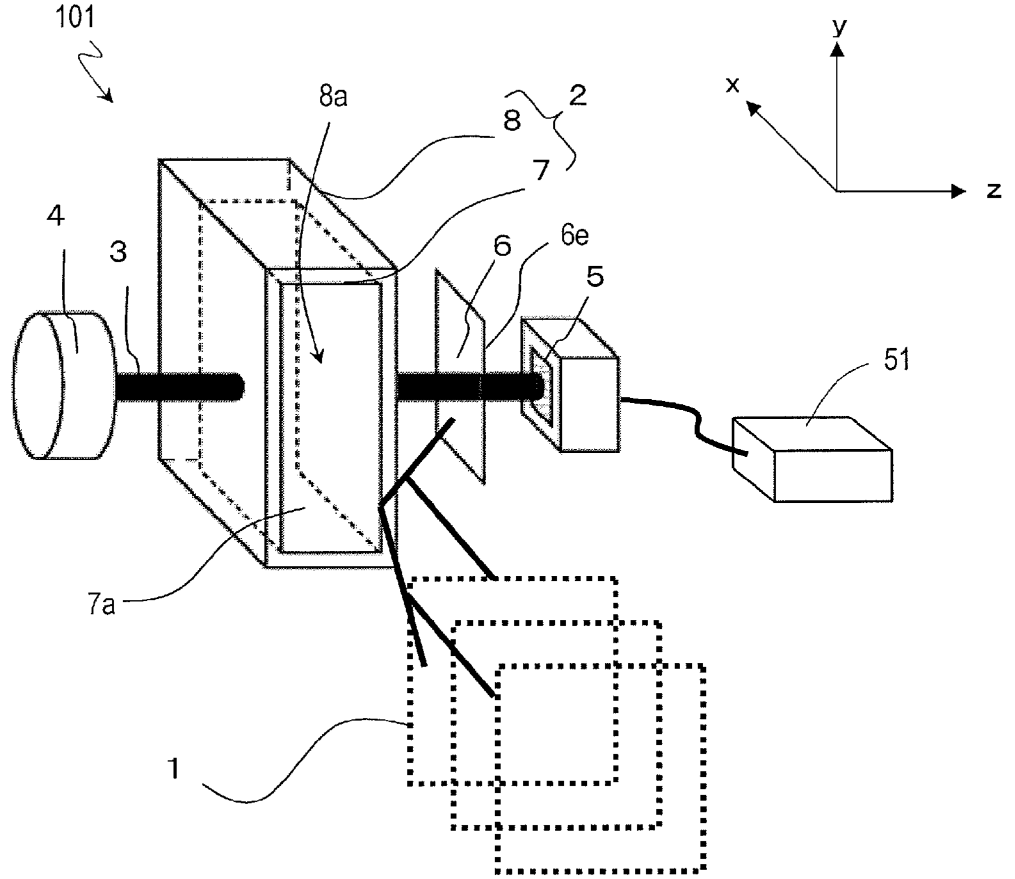
FIG. 1 is a schematic perspective view showing a first embodiment of an optical microphone according to the present invention.

The present inventors made an in-depth research on the problems of the conventional techniques. The optical microphone of Patent Document No. 1 allows laser light to interact with an acoustic wave propagating through the air. Since diffraction is caused by the acoustic wave in the air, there is a significant influence from the convection of the air, thus presenting a problem in terms of environment resistance. Moreover, in the air, the optical diffraction effect due to an acoustic wave is small. Therefore, in order for light to be modulated to such a degree that it can be detected, it is necessary to provide sufficiently large distance over which light and an acoustic wave interact with each other. As a result, it is difficult to make the propagation path in the air for an acoustic wave to be about 10 cm or less, and it is difficult to detect a local acoustic wave. There is also a problem that the device itself will be large in size.

The method of Patent Document No. 2 uses a laser Doppler vibrometer. A laser Doppler vibrometer is large in size as it requires a complicated optical system including an optical frequency shifter, such as an acoustic optical element, a large number of mirrors, beam splitters, lenses, etc. Therefore, there is a problem that the measurement device disclosed in Patent Document No. 2 is large in size as a whole. A research by the present inventors has revealed that when a dry silica gel is used as a propagation medium, there may be a shape defect or shrinkage thereof, and the detection of the acoustic wave may be influenced by the acoustic wave diffraction or leaking waves.

In view of such problems, the present inventors have arrived at a novel optical microphone. One aspect of the present invention will be outlined below.

An optical microphone in one aspect of the present invention is an optical microphone for detecting an acoustic wave propagating through an environmental fluid by using a light wave, the optical microphone including: an acoustic wave receiving section including a propagation medium portion and a first support portion, wherein the propagation medium portion is formed by a solid propagation medium, has an incidence surface through which the acoustic wave enters, and allows the acoustic wave having entered through the incidence surface to propagate therethrough, and the first support portion has an opening for the acoustic wave and supports the propagation medium portion so that the incidence surface is exposed through the opening; a light source for outputting a light wave so that the light wave passes through the propagation medium portion across the acoustic wave propagating through the propagation medium portion; a light-blocking portion having an edge line parallel to the incidence surface of the propagation medium portion for splitting the light wave having passed through the propagation medium portion into a blocked portion and a non-blocked portion; and a photoelectric conversion section for receiving a part of a portion of the light wave having passed through the propagation medium portion which has not been blocked by the light-blocking portion to output an electric signal.

The edge line of the light-blocking portion may cross an optical axis of the light wave having passed through the propagation medium portion.

The optical microphone further includes a second support portion for supporting the light-blocking portion so that it is possible to adjust an angle formed between the edge line of the light-blocking portion and the incidence surface of the propagation medium portion.

An optical microphone in another aspect of the present invention is an optical microphone for detecting an acoustic wave propagating through an environmental fluid by using a light wave, the optical microphone including: an acoustic wave receiving section including a propagation medium portion and a first support portion, wherein the propagation medium portion is formed by a solid propagation medium, has an incidence surface through which the acoustic wave enters, and allows the acoustic wave having entered through the incidence surface to propagate therethrough, and the first support portion has an opening for the acoustic wave and supports the propagation medium portion so that the incidence surface is exposed through the opening; a light source for outputting a light wave so that the light wave passes through the propagation medium portion across the acoustic wave propagating through the propagation medium portion; and a photoelectric conversion section having a light-receiving surface for receiving a portion of the light wave having passed through the propagation medium portion to output an electric signal, wherein the photoelectric conversion section defines at least a portion of the light-receiving surface and has a side, the side splitting the light wave having passed through the propagation medium portion into a portion to be incident on the light-receiving surface and a portion not to be incident thereon, the side being one which is closest to an optical axis of the light wave having passed through the propagation medium portion, and the side being parallel to the incidence surface of the propagation medium portion.

The first support portion may have a pair of side walls sandwiching the propagation medium portion therebetween, the pair of side walls each having a hole for a light wave, the light wave entering the propagation medium portion through the hole of one of the pair of side walls and exiting through the hole of the other one of the pair of side walls.

A sound speed of an acoustic wave propagating through the propagation medium may be less than a sound speed of an acoustic wave propagating through the air.

An acoustic impedance of the propagation medium may be less than or equal to 100 times an acoustic impedance of the air.

The propagation medium may be a dry silica gel.

The light wave may be coherent light.

A wavelength of the light wave may be 600 nm or more.

The optical microphone may further include at least one optical fiber, the at least one optical fiber being arranged between the light source and the light-receiving portion or between the light-receiving portion and the photoelectric conversion section.

The optical microphone may further include a horn provided in the opening.

The optical microphone may further include a beam splitter and a mirror; the beam splitter may be located between the light source and the acoustic wave receiving section; the acoustic wave receiving section may be located between the beam splitter and the mirror; a light wave output from the light source may pass through the beam splitter and the propagation medium portion to be reflected by the mirror; and the light wave having been reflected by the mirror may pass through the propagation medium portion again to be reflected by the beam splitter to enter the photoelectric conversion section.

The optical microphone may further include a signal processing section for receiving the electric signal from the photoelectric conversion section and correcting the electric signal based on a frequency of the electric signal to the power of −1, −2 or −3.

The optical microphone may further include a signal processing section for correcting the electric signal obtained from the photoelectric conversion section based on a pre-measured frequency characteristic.

A $+1^{st}$-order diffracted light wave and a $-1^{st}$-order diffracted light wave of the light wave may be generated through the propagation medium portion due to a refractive index distribution of a propagation medium of the propagation medium portion caused by the propagation of the acoustic wave therethrough; and the photoelectric conversion section may detect at least a portion of one of an area of a $0^{th}$-order diffracted light wave having passed through the propagation medium portion with no diffraction which overlaps the $+1^{st}$-order diffracted light wave and an area thereof which overlaps the $-1^{st}$-order diffracted light wave, or detect both of these areas with different amounts of light.

A method for detecting an acoustic wave in one aspect of the present invention is a method for detecting an acoustic wave propagating through an environmental fluid by using a light wave, the method including the steps of: allowing an acoustic wave to enter a propagation medium portion formed by a solid propagation medium through an incidence surface of the propagation medium portion so as to propagate through an inside thereof; outputting a light wave from a light source to the propagation medium portion so as to pass through the propagation medium portion across the acoustic wave propagating through the propagation medium portion; and splitting a light wave having passed through the propagation medium portion into a blocked portion and a non-blocked portion by means of an edge line of a blocking portion parallel to the incidence surface so as to receive the non-blocked portion of the light wave by means of a photoelectric conversion section to convert the non-blocked portion to an electric signal.

The step of converting to an electric signal may include the steps of: measuring the electric signal while rotating the edge line of the light-blocking portion, which is located between the blocked portion and the non-blocked portion of the light wave, about an optical axis of the light wave having passed through the propagation medium portion; and obtaining the electric signal by fixing a position of the edge line at such an angle that the electric signal is maximized.

A method for detecting an acoustic wave in one aspect of the present invention is a method for detecting an acoustic wave propagating through an environmental fluid by using a light wave, the method including the steps of: allowing an acoustic wave to enter a propagation medium portion formed by a solid propagation medium through an incidence surface of the propagation medium portion so as to propagate through an inside thereof; outputting a light wave from a light source to the propagation medium portion so as to pass through the propagation medium portion across the acoustic wave propagating through the propagation medium portion; and receiving a portion of the light wave having passed through the propagation medium portion by means of a photoelectric conversion section having a light-receiving surface to output an electric signal, wherein the photoelectric conversion section defines at least a portion of the light-receiving surface and has a side, the side splitting the light wave having passed through the propagation medium portion into a portion to be incident on the light-receiving surface and a portion not to be incident thereon, the side being one which is closest to an optical axis of the light wave having passed through the propagation medium portion, and the side being parallel to the incidence surface of the propagation medium portion.

The step of converting to an electric signal may include the steps of: measuring the electric signal while rotating a side, which is located between a portion to be incident on the light-receiving surface and a portion not to be incident thereon, about an optical axis of the light wave having passed through the propagation medium portion; and obtaining the electric signal by fixing a position of the side at such an angle that the electric signal is maximized.

First Embodiment

A first embodiment of the optical microphone according to the present invention will now be described. FIG. 1 is a perspective view schematically showing a configuration of an optical microphone 101 of the first embodiment.

1. Configuration of Optical Microphone 101

The optical microphone 101 includes an environmental fluid surrounding the outside of the optical microphone 101, wherein an acoustic wave 1 propagates through the environmental fluid. While the environmental fluid is the air, for example, it may be another gas or a liquid such as water. The optical microphone 101 includes an acoustic wave receiving section 2, a light source 4, and a photoelectric conversion section 5. The propagating acoustic wave 1 is received by the acoustic wave receiving section 2 to propagate through the acoustic wave receiving section 2. A light wave 3 output from the light source 4 interacts with the acoustic wave 1 propagating through the acoustic wave receiving section 2 as it passes through the acoustic wave receiving section 2. The light wave 3 having passed through the acoustic wave receiving section 2 is detected by the photoelectric conversion section 5. In the present embodiment, the optical microphone 101 further includes a light-blocking portion 6 in order for the photoelectric conversion section 5 to detect a portion of the light wave 3 having passed through the acoustic wave receiving section 2. Moreover, a signal processing section 51 is further included for processing the electric signal of the acoustic wave 1 detected by the photoelectric conversion section 5.

Each component will now be described in detail. Note that the direction in which the acoustic wave 1 propagates is assumed to be the x axis, the direction in which the light wave 3 propagates to be the z axis, and the axis orthogonal to the x axis and the z axis to be the y axis, as shown in FIG. 1.

(Acoustic Wave Receiving Section 2)

The acoustic wave receiving section 2 includes a propagation medium portion 7 and a support portion (first support portion) 8.

Propagation Medium Portion 7

Figure 2:
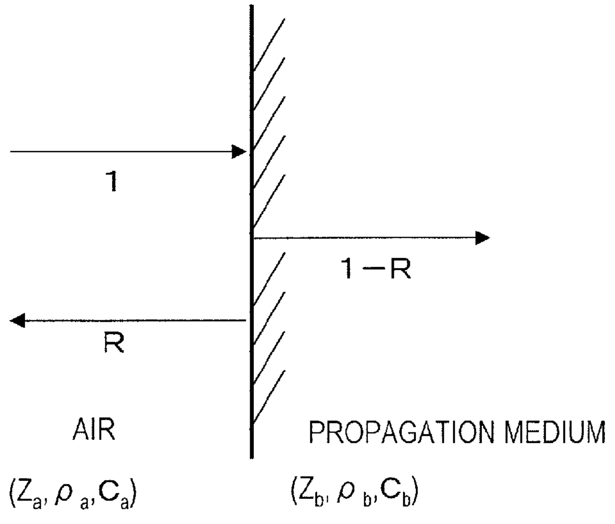
FIG. 2 is a diagram showing the reflection of an acoustic wave at the interface between the air and the propagation medium portion.

The propagation medium portion 7 has an incidence surface 7*a* through which the acoustic wave 1 enters, and allows the acoustic wave 1 having entered through the incidence surface 7*a* to propagate therethrough. The propagation medium portion 7 is formed by a solid propagation medium. FIG. 2 shows an interface between the air, which is the environmental fluid, and the propagation medium portion 7. As the acoustic wave 1 is taken into the propagation medium portion 7, reflection occurs at the interface between the environmental fluid and the propagation medium portion 7 as shown in the figure. Therefore, the propagation medium of the propagation medium portion 7 may be selected such that the acoustic impedance difference between the environmental fluid and the propagation medium is small, so as to minimize the reflection of the acoustic wave 1 at the interface between the propagation medium portion 7 and the environmental fluid.

The acoustic impedance Z can be expressed as shown in Expression (1) below, using the density p and the sound speed C.

$$Z=\rho\cdot C \tag{1}$$

The reflection R at an interface between two substances whose acoustic impedances are $Z_a$ and $Z_b$ can be expressed as shown in Expression (2) below.

$$R=((Z_b-Z_a)/(Z_b+Z_a)) \tag{2}$$

From Expressions (1) and (2), in order to decrease the reflection R at the interface between the air and the propagation medium, it is advantageous that the solid propagation medium of the propagation medium portion 7 has a small density and a low sound speed. For example, with the air, as the environmental fluid, having a density of about 1.3 kg/m$^3$ and a sound speed of 340 m/sec, consider a case where a quartz glass having a density of 2200 kg/m$^3$ and a sound speed of 5900 m/sec is used as the propagation medium. The acoustic impedance of the quartz glass is about $2.9\times10^4$ times the acoustic impedance of the air, and 99.986% of the energy of the acoustic wave which is to propagate from within the air into the quartz glass is reflected at the interface between the air and the quartz glass. Thus, where the acoustic wave 1 propagating through the air is to be taken in by using a quartz glass, most of the acoustic wave energy is reflected at the interface therebetween, thereby failing to efficiently taking in the acoustic wave 1. That is, a quartz glass is a material that is unpreferable as the propagation medium of the propagation medium portion 7.

The density of a normal solid is greater than that of the air by orders of magnitude. The sound speed of an acoustic wave propagating through a normal solid is higher than the sound speed of the acoustic wave propagating through the air. Therefore, an ordinary solid is also, as is a quartz glass, unpreferable as a material of the propagation medium portion 7.

On the other hand, the density of a dry silica gel is 70 kg/m$^3$ or more and 280 kg/m$^3$ or less, and the sound speed of a dry silica gel is lower than the sound speed through the air and is about 50 m/sec or more and 150 m/sec or less. Therefore, the acoustic impedance of a dry silica gel is 100 times or less the acoustic impedance of the air. More specifically, where a dry silica gel having a density of 100 kg/m$^3$ and a sound speed of 50 m/sec is used, for example, the acoustic impedance is about 11.3 times the acoustic impedance of the air. Thus, the reflection of the acoustic wave 1 at the interface is as small as 70%, whereby about 30% of the energy of the acoustic wave 1 is taken into the dry silica gel without being reflected by the interface. Thus, it is possible to efficiently take the acoustic wave in the air into the dry silica gel. For these reasons, a dry silica gel may be used as the propagation medium of the propagation medium portion 7.

Support Portion 8

The support portion 8 supports the propagation medium portion 7. Thus, the support portion 8 has an opening 8*a* and an inner space connected to the opening 8*a*, and the propagation medium portion 7 is placed and supported in the inner space. The incidence surface 7*a* of the propagation medium portion 7 is exposed through the opening 8*a* to be in contact with the environmental fluid. The acoustic wave 1 propagating through the environmental fluid is taken into the propagation medium portion 7 through the incidence surface 7*a* in the opening 8*a*.

The light wave 3 output from the light source 4 passes through the acoustic wave receiving section 2. Therefore, the support portion 8 may be formed by a material that is transparent to the light wave 3. Where the support portion 8 is formed by a material that is opaque to the light wave 3, a hole 10 may be provided in an area through which the light wave 3 enters the support portion 8 and in an area through which the light wave 3 exits the support portion 8.

(Light Source 4)

The light source 4 outputs the light wave 3. The light wave 3 may be coherent light or incoherent light. Note however that with coherent light such as laser light, interference of the diffracted light wave is more likely to occur, making it easier to detect the acoustic wave 1.

Figure 4:
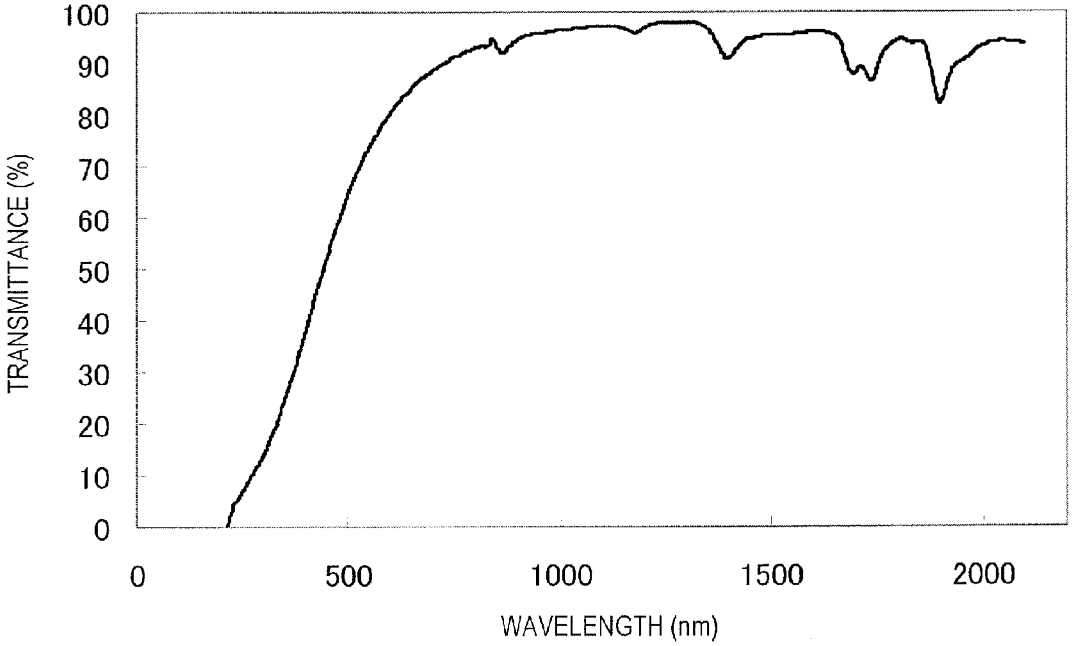
FIG. 4 is a graph showing a transmitted light spectrum of a dry silica gel.

FIG. 4 shows the results of measuring the wavelength characteristics of the transmittance of the light wave for a dry silica gel having a thickness of 5 mm. Since the light wave 3 needs to pass through the propagation medium portion 7, it is necessary to select the wavelength of the light wave 3 to be output from the light source 4 so as to avoid a significant light propagation loss through the propagation medium portion 7. As shown in FIG. 4, if the wavelength is 600 nm or more, a transmittance of about 80% is obtained, and the light wave 3 having passed through the propagation medium portion 7 can be detected with a sufficient detection sensitivity. Therefore, the wavelength of the light wave 3 may be 600 nm or more. As can be seen from FIG. 4, a transmittance of 80% or more is obtained if the wavelength is 600 nm or more and up to 2000 nm.

(Photoelectric Conversion Section 5)

The photoelectric conversion section 5 receives a portion of the light wave 3 exiting the acoustic wave receiving section 2 having passed therethrough, and outputs an electric signal having an amplitude in accordance with the amount of light through a photoelectric conversion. The photoelectric conversion section 5 has a detection sensitivity for the wavelength of the light wave 3.

(Signal Processing Section 51)

As will be described below, an electric signal obtained from the photoelectric conversion section has an amplitude intensity in accordance with the frequency thereof. Therefore, where it is desirable to detect the acoustic wave with a constant sensitivity, the signal processing section 51 may be further included for correcting the electric signal with the frequency of the electric signal to the power of −1, −2 or −3.

(Light-Blocking Portion 6)

As will be described in detail below, it is important with the optical microphone 101 that the photoelectric conversion section 5 receives a portion of the light wave 3 exiting the acoustic wave receiving section 2 having passed therethrough. Therefore, the optical microphone 101 includes the light-blocking portion 6. The light-blocking portion 6 is formed by a material that is opaque to the light wave 3. Herein, being opaque means that the transmittance is 10% or less, for example. The light-blocking portion 6 is arranged between the acoustic wave receiving section 2 and the photoelectric conversion section 5 so as to block a portion of the light wave 3 having passed through the acoustic wave receiving section 2 and prevents it from entering the photoelectric conversion section 5.

Figure 5:
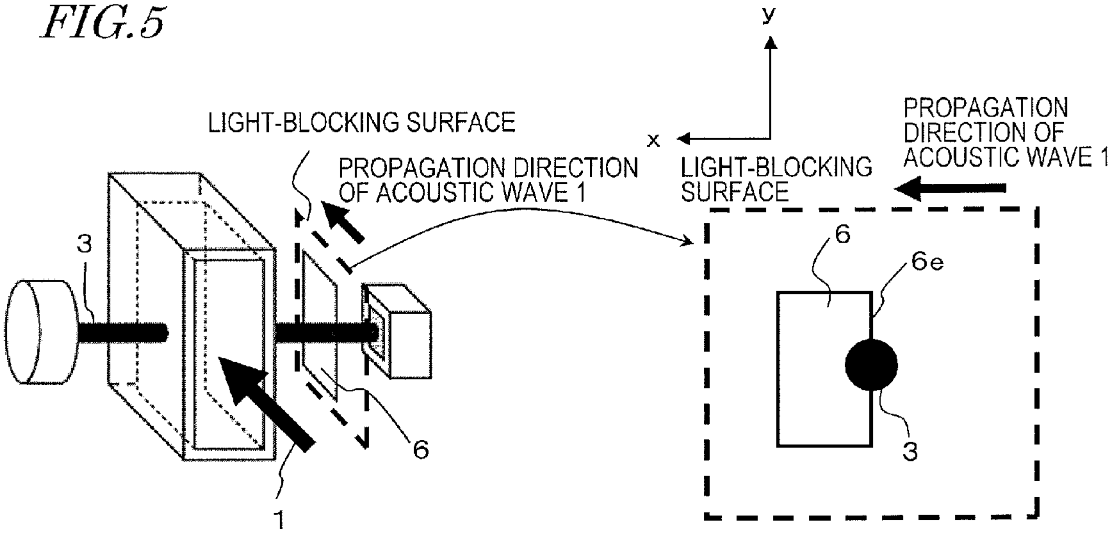
FIG. 5 is a diagram showing a manner in which a light wave 3 is blocked by a light-blocking portion 6.
Figure 6A:
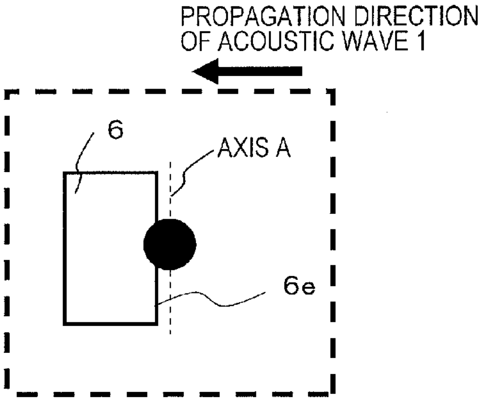
FIGS. 6A to 6C are diagrams each showing another manner in which the light wave 3 is blocked by the light-blocking portion 6.
Figure 6B:
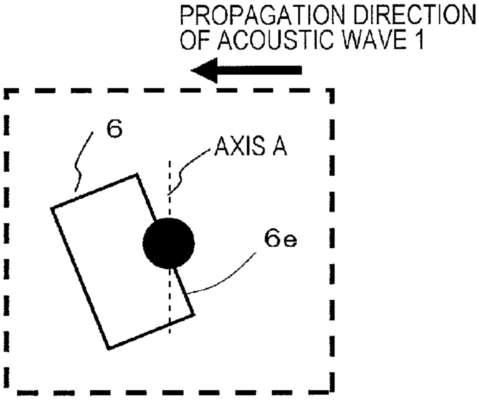
Figure 6C:
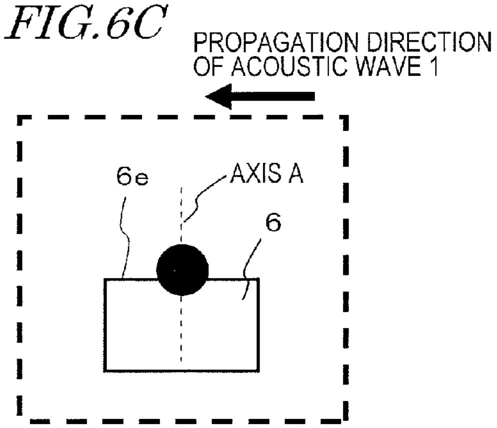

FIG. 5 shows an arrangement of the light-blocking portion 6 as seen in the direction from the acoustic wave receiving section 2 toward the photoelectric conversion section 5. Hereinafter, the surface on which the light-blocking portion 6 blocks the light wave 3 will be referred to as the blocking surface. As shown in FIG. 5, an edge line 6*e* of the light-blocking portion 6 may extend across the area to be irradiated with the light wave 3 on the blocking surface so that the light-blocking portion 6 blocks a portion of the light wave 3 having passed through the acoustic wave receiving section 2. Thus, the edge line 6*e* splits the light wave 3 into a portion to be blocked and a portion not to be blocked. While the edge line 6*e* of the light-blocking portion 6 passes through and crosses the center of the area to be irradiated with the light wave 3, i.e., the optical axis of the light wave 3, in FIG. 5, the edge line 6*e* may be off of, and not cross, the center of the irradiated area, i.e., the optical axis of the light wave 3, as shown in FIG. 6A. While the light-blocking portion 6 covers a portion of the area to be irradiated with the light wave 3 that is on the positive side along the x axis in FIG. 5, it may cover a negative-side area. As will be described in detail below, the edge line 6*e* is most preferably arranged so as to be perpendicular to the propagation direction of the acoustic wave 1. As shown in FIG. 6B, the edge line 6*e* may be non-perpendicular to the propagation direction of the acoustic wave 1. Note however that as will be described below, it is an unpreferable arrangement that the edge line 6*e* is parallel to the propagation direction of the acoustic wave 1 as shown in FIG. 6C.

(Auxiliary Components)

Optical Fibers 11 and 11'

Figure 7:
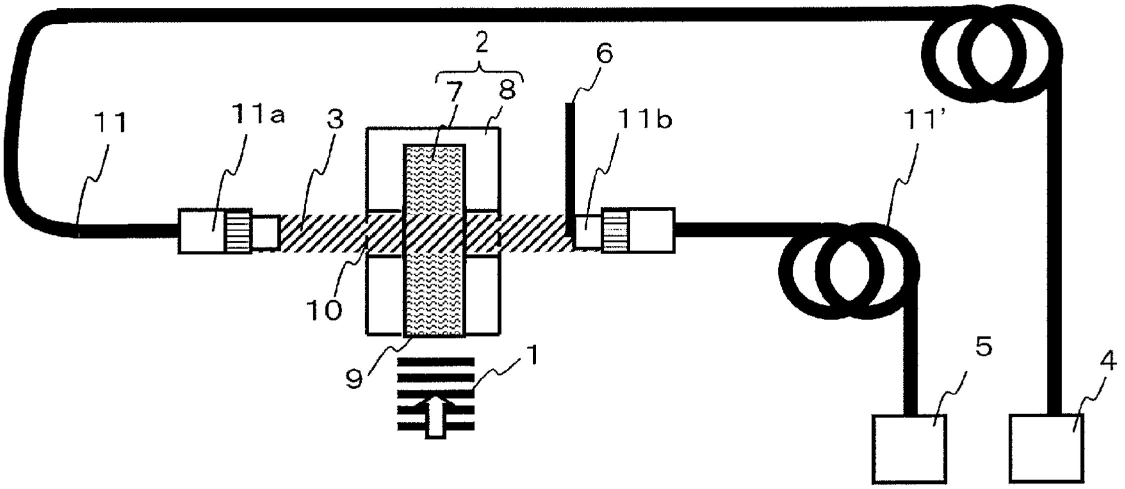
FIG. 7 is a diagram showing an example in which an optical fiber is used in the first embodiment.

Note that in the optical microphone 101, an optical fiber may be placed at at least one location along the optical path of the light wave 3 between the light source 4 and the acoustic wave receiving section 2 and between the acoustic wave receiving section 2 and the photoelectric conversion section 5. As shown in FIG. 7, one end of an optical fiber 11 is connected to the light source 4, and the other end 11*a* is placed close to the acoustic wave receiving section 2 so as to allow the light wave 3 to enter the acoustic wave receiving section 2. After a portion thereof is blocked by the light-blocking portion 6, the light wave 3 having passed through the acoustic wave receiving section 2 is coupled to an optical fiber 11' via an end portion 11*b*. The other end of the optical fiber 11' is connected to the photoelectric conversion section 5.

By using the optical fibers 11 and 11' along the optical path of the light wave 3, the light source 4 and the photoelectric conversion section 5 can be arranged away from the acoustic wave receiving section 2. Where the acoustic wave 1 is detected in a place where there is a high level of electromagnetic noise, it is possible to detect the acoustic wave 1 without being influenced by electromagnetic noise by placing only the acoustic wave receiving section 2 for receiving the acoustic wave 1 at the site of measurement while placing the light source 4 and the photoelectric conversion section 5 in a place where the influence of electromagnetic noise cannot reach. Since the use of the optical fibers 11 and 11' enables an arrangement where the exit surface of the light source 4 and the light-receiving surface of the photoelectric conversion section 5 are not facing each other, it is possible to increase the degree of freedom in the arrangement of components of the optical microphone 101 and to realize the optical microphone 101 of a smaller size.

Horn 12

Figure 8:
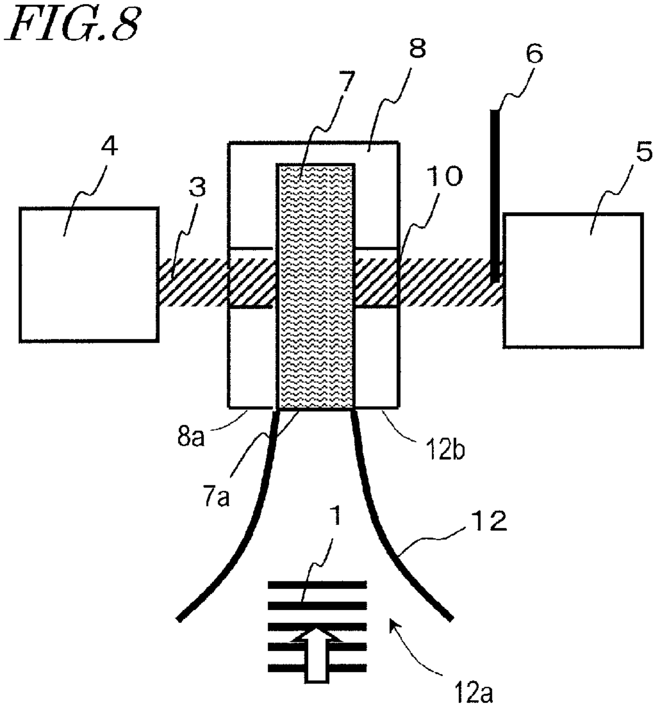
FIG. 8 is a diagram showing an example in which a horn is used in the first embodiment.

The optical microphone 101 may further include a horn 12 for collecting sound. As shown in FIG. 8, the horn 12 has a first opening 12*a*, and a second opening 12*b* smaller than the first opening 12*a*, where the second opening 12*b* is connected to the opening 8*a* of the acoustic wave receiving section 2. Since the cross-sectional area of the passage of the horn 12 gradually decreases from the first opening 12*a* toward the second opening 12*b*, the sound pressure of the acoustic wave 1 having entered through the first opening 12*a* is increased through the horn 12. Thus, it is possible to further increase the sensitivity of the optical microphone 101.

2. Operation of Optical Microphone 101

Next, an operation of the optical microphone 101 will be described. As shown in FIG. 1, the acoustic wave 1 propagating through the air is taken into the propagation medium portion 7 through the incidence surface 7*a* of the propagation medium portion 7, which is exposed through the opening 8*a*, and the acoustic wave 1 propagates through the inside of the propagation medium portion 7. The light wave 3 output from the light source 4 enters the propagation medium portion 7 and comes into contact with the acoustic wave 1 inside the propagation medium portion 7.

Figure 9:
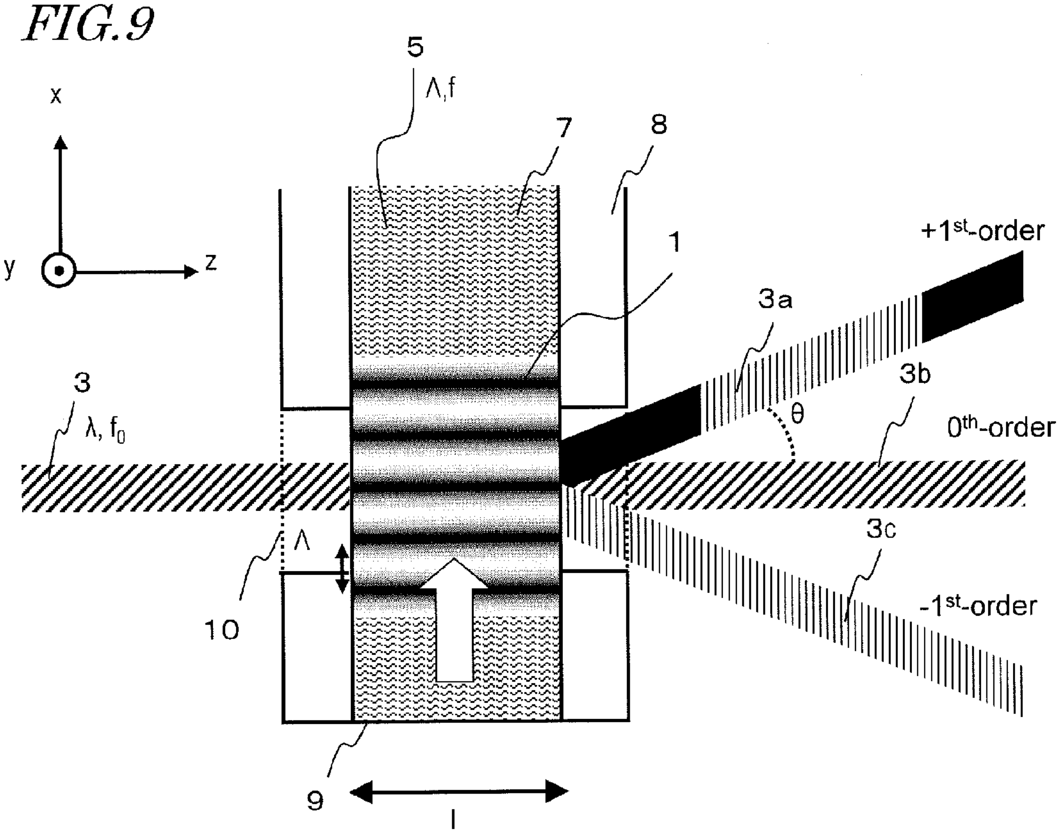
FIG. 9 is a diagram showing the diffraction of the light wave 3 by the acoustic wave 1 in a propagation medium portion 7.

FIG. 9 shows how the acoustic wave 1 and the light wave 3 come into contact with each other inside the propagation medium portion 7. The wavelength and the frequency of the acoustic wave 1 inside the propagation medium portion 7 are denoted as Λ and f. The wavelength and the frequency of the light wave 3 output from the light source 4 are denoted as λ and $f_0$. As the acoustic wave 1 propagates through the propagation medium portion 7, the density of the propagation medium of the propagation medium portion 7 changes, thereby changing the refractive index accordingly. That is, as the acoustic wave 1 propagates, a refractive index distribution pattern, in which the refractive index changes with a cycle corresponding to the wavelength Λ, propagates in the propagation direction of the acoustic wave 1. When the light wave 3 comes into contact with this, the refractive index distribution pattern produced by the acoustic wave 1 acts as if it were a diffraction grating. Thus, the light wave 3 exiting the propagation medium portion 7 after contacting the acoustic wave 1 contains diffracted light waves. A light wave diffracted in the propagation direction of the acoustic wave 1 is referred to as a $+1^{st}$-order diffracted light wave 3*a*, a light wave diffracted in the direction opposite to the propagation direction of the acoustic wave 1 as a $-1^{st}$-order diffracted light wave 3*c*, and a light wave exiting intact without being diffracted as a $0^{th}$-order diffracted light wave 3*b*. Where the sound pressure of the acoustic wave 1 is large, there are also higher-order diffracted light waves of second and higher orders. Hereinbelow, a case where higher-order diffracted light waves can be ignored will be discussed using three diffracted light waves shown in FIG. 3.

Since the acoustic wave 1 propagates in the x direction through the propagation medium portion 7, the diffraction grating produced by the refractive index distribution pattern also propagates with a momentum in the x direction. Thus, diffracted light diffracted by the refractive index distribution pattern is susceptible to Doppler shift. Specifically, the frequency of the $+1^{st}$-order diffracted light wave 3*a* is $f_0+f$, and the frequency of the $-1^{st}$-order diffracted light wave 3*c* is $f_0-f$. Since the $0^{th}$-order diffracted light wave 3*b* is not diffracted, the frequency of the $0^{th}$-order diffracted light wave 3*b* remains to be $f_0$ as it is before entering the propagation medium portion 7. The phases of the $+1^{st}$-order diffracted light wave 3*a* and the $-1^{st}$-order diffracted light wave 3*c* are reversed from each other, i.e., different from each other by 180°.

By allowing interference between the $0^{th}$-order diffracted light wave 3*b* and the $+1^{st}$-order diffracted light wave 3*a* or between the $0^{th}$-order diffracted light wave 3*b* and the $-1^{st}$-order diffracted light wave 3*c*, there is generated a difference frequency light component whose frequency is f. Photoelectrically converting this through the photoelectric conversion section 5 yields an electric signal whose frequency is f. This electric signal is obtained by converting the acoustic wave 1 into an electric signal. Note that where the sound pressure of the acoustic wave 1 is large, and higher-order diffracted light waves are produced, higher harmonics are superposed over the electric signal output from the photoelectric conversion section 5.

Figure 10A:
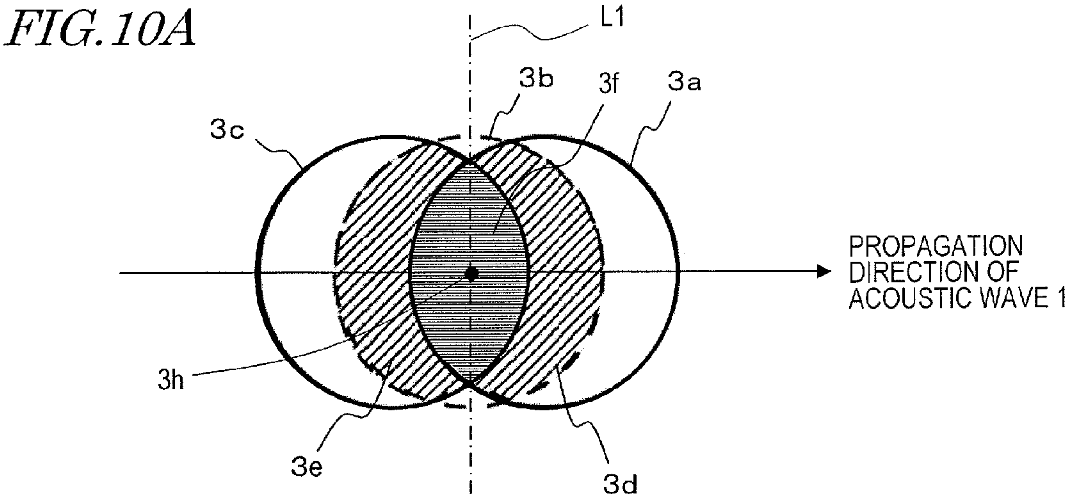
FIGS. 10A and 10B are diagrams showing the overlap between the $0^{th}$-order diffracted light wave and the $\pm 1^{st}$-order diffracted light waves.
Figure 10B:
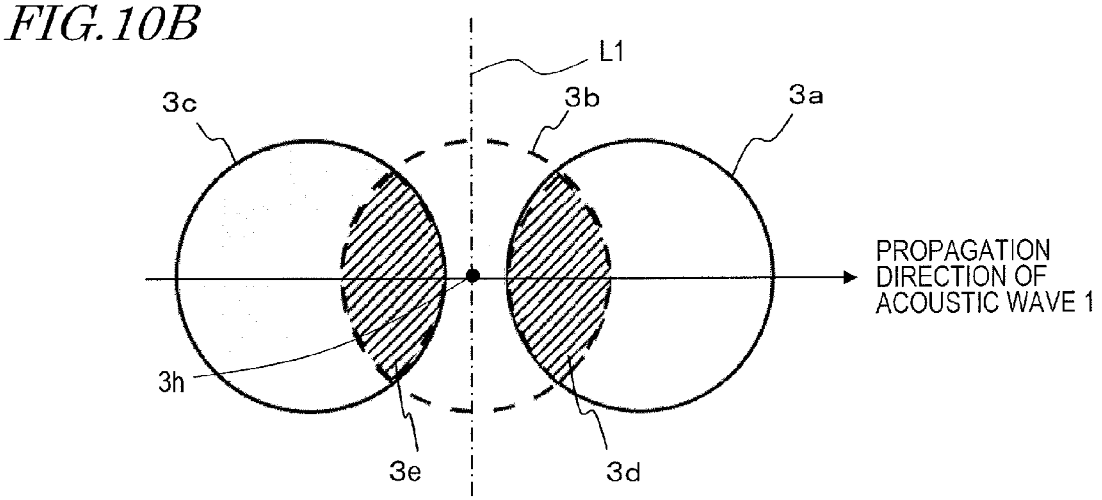

FIG. 10 is a diagram showing diffracted light of the light wave 3 having passed through the propagation medium portion 7 as seen from the direction from the photoelectric conversion section toward the acoustic wave receiving section (the direction opposite to the exiting direction of the light wave 3) on a plane perpendicular to the propagation direction of the light wave 3. Where the diffraction angle between the $+1^{st}$-order diffracted light wave 3*a* and the $-1^{st}$-order diffracted light wave 3*b* is large or where the distance from the acoustic wave receiving section 2 is large, the $+1^{st}$-order diffracted light wave 3*a* and the $-1^{st}$-order diffracted light wave 3*c* do not overlap each other but are separated from each other as shown in FIG. 10B. However, where the diffraction angle between the $+1^{st}$-order diffracted light wave 3*a* and the $-1^{st}$-order diffracted light wave 3*b* is small or where the distance from the acoustic wave receiving section 2 is small, the $+1^{st}$-order diffracted light wave 3$a$ and the $-1^{st}$-order diffracted light wave 3$c$ partially overlap each other as shown in FIG. 10A.

When the interference light between the $+1^{st}$-order diffracted light wave 3$a$ and the $0^{th}$-order diffracted light wave 3$b$ and the interference light between the $-1^{st}$-order diffracted light wave 3$c$ and the $0^{th}$-order diffracted light wave 3$b$ are simultaneously received by the photoelectric conversion section 5, they are canceled out by each other, thereby failing to detect the signal, because the phases of the two sets of interference light are shifted from each other by 180°. Therefore, as shown in FIG. 10A, interference light cannot be detected in an area 3$f$ where the $+1^{st}$-order diffracted light wave 3$a$ and the $-1^{st}$-order diffracted light wave 3$c$ overlap each other and overlap the $0^{th}$-order diffracted light wave 3$b$. Either in the case of FIG. 10A or FIG. 10B, interference light whose intensity changes in accordance with the acoustic wave is obtained in areas 3$d$ and 3$e$ shown in the figure.

However, when the interference light of the area 3$d$ and the area 3$e$ are detected simultaneously, the interference light of the two areas are canceled out by each other and cannot be detected since the phases are shifted from each other by 180°. Therefore, it is necessary to alter the balance in the amount of interference light between the area 3$d$ and the area 3$e$ by detecting interference light of only one of the area 3$d$ and the area 3$e$ by means of the photoelectric conversion section 5 or by some other means.

As can be seen from FIGS. 10A and 10B, the area 3$d$ and the area 3$e$ where the $0^{th}$-order diffracted light wave 3$b$ overlaps the $+1^{st}$-order diffracted light wave 3$a$ or the −1st-order diffracted light wave 3$c$ cross the optical axis 3$h$ on a plane perpendicular to an optical axis 3$h$ of the $0^{th}$-order diffracted light wave 3$b$ and is in line symmetry with each other with respect to a line L1 perpendicular to the propagation direction of the acoustic wave 1. The area 3$d$ and the area 3$e$ are located within the spot of the $0^{th}$-order diffracted light wave 3$b$. Therefore, if the whole of the $0^{th}$-order diffracted light wave 3$b$ is detected by the photoelectric conversion section 5, the light wave will simultaneously contain the interference light of the area 3$d$ and the area 3$e$ with the same intensity, thereby substantially completely canceling out the two interference light with each other. In contrast, if on a plane perpendicular to the optical axis 3$h$ of the $0^{th}$-order diffracted light wave 3$b$, the $0^{th}$-order diffracted light wave 3$b$ incident on the photoelectric conversion section 5 is asymmetric with respect to the line L1, the detected light wave will contain the interference light of the area 3$d$ and the interference light of the area 3$e$ with different amounts of light. Herein, "the $0^{th}$-order diffracted light wave 3$b$ being asymmetric with respect to the line L1" refers to a case where the shape of the cross section of the $0^{th}$-order diffracted light wave 3$b$ incident on the photoelectric conversion section 5 in a direction perpendicular to the optical axis is asymmetric with respect to the line L1, and a case where the shape of the cross section is symmetric with respect to the line L1 but the intensities of the interference light of the area 3$d$ and the area 3$e$ are different from each other.

The optical microphone 101 includes the light-blocking portion 6 so that the photoelectric conversion section 5 detects the $0^{th}$-order diffracted light wave 3$b$ under such a condition, and as a portion of the $0^{th}$-order diffracted light wave 3$b$ is blocked by the light-blocking portion 6, the photoelectric conversion section 5 detects the remaining portion of the $0^{th}$-order diffracted light wave 3$b$. More specifically, at least a portion of one of the area 3$d$ of the $0^{th}$-order diffracted light wave 3$b$ which overlaps the $+1^{st}$-order diffracted light wave 3$a$ and the area 3$e$ thereof which overlaps the $-1^{st}$-order diffracted light wave 3$b$ is detected, or both of these areas with different amounts of light are detected.

Figure 11:
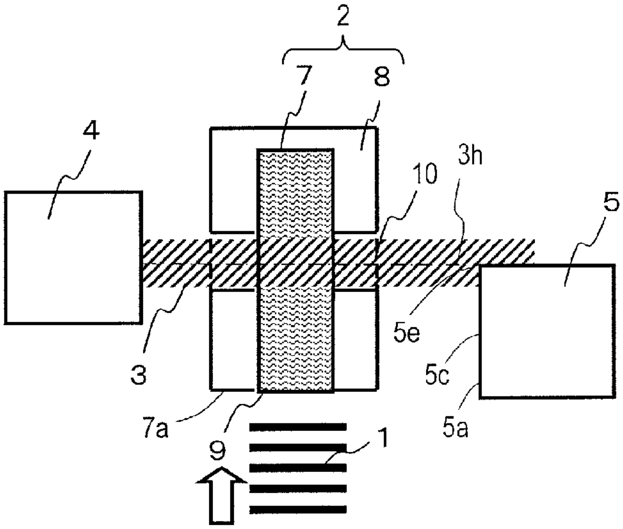
FIG. 11 is a diagram showing an example in which a photoelectric conversion section 5 is shifted in the first embodiment.
Figure 12A:
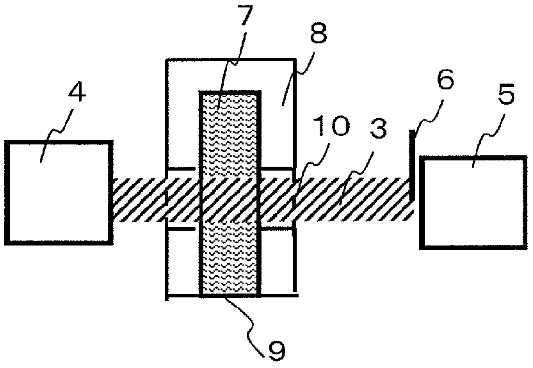
FIGS. 12A and 12B are diagrams showing a case where the acoustic wave 1 is not input to the optical microphone of the first embodiment and another case where it is.
Figure 12B:
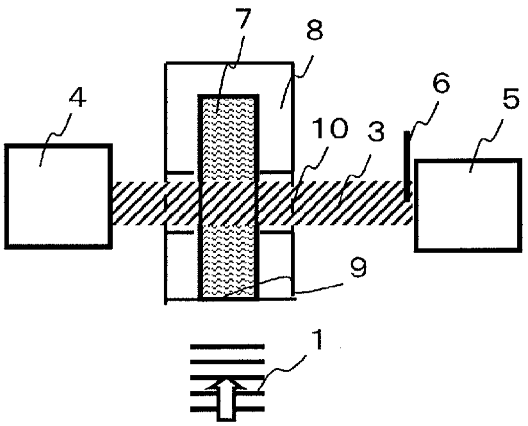
Figure 12C:
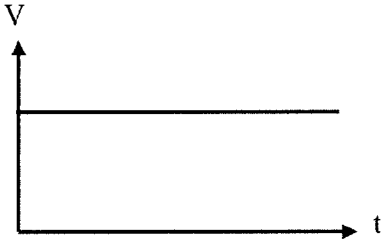
FIGS. 12C and 12D are graphs showing the electric signal obtained from the photoelectric conversion section where the acoustic wave 1 is not input to the optical microphone and where it is.
Figure 12D:
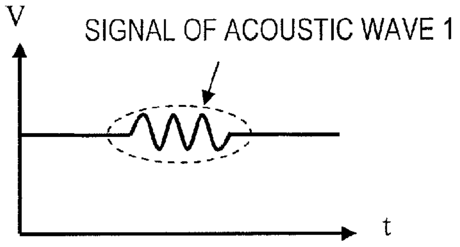

Instead of providing the light-blocking portion 6, a center 5$c$ of a light-receiving surface 5$a$ of the photoelectric conversion section 5 may be shifted from the optical axis 3$h$ of the light wave 3 having passed through the acoustic wave receiving section 2, as shown in FIG. 11.

FIG. 12 schematically shows a signal detected by the optical microphone according to the present embodiment. As shown in FIGS. 12A and 12C, where the acoustic wave 1 is not being received, the detected $0^{th}$-order diffracted light wave 3$b$ does not contain interference light described above, and therefore the electric signal obtained from the photoelectric conversion section 5 is not modulated by the acoustic wave 1 and only contains a DC component based on the $0^{th}$-order diffracted light wave 3$b$ of a constant intensity. In contrast, where the acoustic wave 1 is being received, as shown in FIGS. 12B and 12D, the electric signal obtained from the photoelectric conversion section 5 contains a DC component of the $0^{th}$-order diffracted light wave 3$b$ of a constant intensity and a component of the acoustic wave 1 superposed over the DC component. Where only the component of the acoustic wave 1 is needed, the DC component can be electrically removed by using a high-pass filter, or the like.

Next, the diffraction angle and the light intensity of the $+1^{st}$-order diffracted light wave 3$a$ and the $-1^{st}$-order diffracted light wave 3$c$, which generate an interference component will be described.

As shown in FIG. 9, the diffraction angle between the $+1^{st}$-order diffracted light wave 3$a$ and the $-1^{st}$-order diffracted light wave 3$c$ is denoted as θ and the light intensity of the $+1^{st}$-order diffracted light wave 3$a$ and the $-1^{st}$-order diffracted light wave 3$c$ is denoted as $I_1$. The diffraction angle θ and the light intensity $I_1$ are represented by Expressions (3) and (4) below.

$$\sin\theta=\lambda/\theta \quad (3)$$

$$I_1=I_{in}\cdot J_1^{\,2}(2\pi\Delta nl/\lambda) \quad (4)$$

Herein, $I_{in}$ represents the incident intensity of the light wave, Δn the amount of change in refractive index of the propagation medium portion 7, and l the length over which the light wave 3 propagates through the propagation medium portion 7. $J_1$ represents a Bessel function of the 1st order.

From Expression (3), it can be seen that diffraction angle θ is larger as the wavelength Λ of the acoustic wave 1 is smaller. Since the relationship between the wavelength Λ and the frequency f of the acoustic wave 1 and the sound speed C through the propagation medium portion 7 can be expressed as C=f·Λ, the wavelength Λ is smaller as the sound speed C is smaller. For example, consider a case where the spot diameter of the light wave 3 is 0.6 mm, the light wave 3 having a wavelength of 633 nm is diffracted by an acoustic wave having a frequency of 40 kHz through the propagation medium portion 7, and the $+1^{st}$-order diffracted light wave 3$a$ and the $-1^{st}$-order diffracted light wave 3$c$ are observed from a position 25 cm apart from the propagation medium portion 7. Where the propagation medium portion 7 is a quartz glass, the air and a dry silica gel having a sound speed of 50 m/sec, the diffraction angles θ are $4.3\times10^{-6}$ rad, $7.45\times10^{-5}$ rad and $5.1\times10^{-4}$, respectively. Then, the center-to-center distance between the $0^{th}$-order diffracted light wave 3$b$ and the $+1^{st}$-order diffracted light wave 3$a$ (and the $-1^{st}$-order diffracted light wave 3$c$) is 1.1 μm, 19 μm and 130 μm, respectively. Therefore, under these conditions, the $+1^{st}$-order diffracted light wave 3$a$ and the $-1^{st}$-order diffracted light wave 3$c$ are not separated from each other but overlap each other as shown in FIG. 10A. As the area 3*f*, over which the $+1^{st}$-order diffracted light wave 3*a* and the $-1^{st}$-order diffracted light wave 3*c* overlap each other, is smaller, the area 3*d* and the area 3*e* have a larger area, and therefore the intensity of interference light in the light wave detected is higher. Thus, a material whose sound speed is low may be used as the propagation medium of the propagation medium portion 7. Also in this respect, a dry silica gel can be said to be suitable as the propagation medium of the propagation medium portion 7.

The sensitivity of the optical microphone 101 is dependent on the amount of light of the interference light between the $0^{th}$-order diffracted light wave 3*b* and the $+1^{st}$-order diffracted light wave 3*a* or the $-1^{st}$-order diffracted light wave 3*c*. Since the amount of light of the interference light changes in accordance with the intensity of the $+1^{st}$-order diffracted light wave 3*a* or the $-1^{st}$-order diffracted light wave 3*c*, the sensitivity of the optical microphone 101 is higher as the intensity of the $+1^{st}$-order diffracted light wave 3*a* or the $-1^{st}$-order diffracted light wave 3*c* is higher. From Expression (4), the intensity $I_1$ of the $+1^{st}$-order diffracted light wave 3*a* and the $-1^{st}$-order diffracted light wave 3*c* is higher as the change Δn in refractive index is larger, and therefore a material having a large change Δn in refractive index may be used as the material of the propagation medium portion 7. The change Δn in refractive index of the air is $2.0\times10^{-9}$ for a change in the sound pressure of 1 Pa, whereas the amount of change Δn in refractive index of a dry silica gel is about $1.0\times10^{-7}$ for a change in the sound pressure of 1 Pa, which is 50 times that of the air. Therefore, also in this respect, it can be said that a dry silica gel is suitable as the material of the propagation medium portion 7.

Thus, with the optical microphone of the present embodiment, since the propagation medium portion is formed by a propagation medium which is a solid and has a sound speed lower than that of the air, the acoustic wave propagating through the environmental fluid can be made to enter the propagation medium portion with a high efficiency while suppressing the reflection thereof at the interface. Since the propagation medium is a solid, the change in refractive index caused by the propagation of the acoustic wave through the propagation medium portion is large, thereby producing a $+1^{st}$-order diffracted light wave and a $-1^{st}$-order diffracted light wave of a high intensity. Particularly, by using a dry silica gel as the propagation medium, it is possible to increase the area over which interference light is produced, and also to increase the intensity of the interference light. Therefore, it is possible to detect an acoustic wave with a high sensitivity with a high S/N.

Since the modulated component modulated by the acoustic wave is detected as an interference component between a $0^{th}$-order diffracted light wave and a $+1^{st}$-order diffracted light wave or a $-1^{st}$-order diffracted light wave, the change in the amount of light of the interference component corresponds to the acoustic wave to be detected. Therefore, without using a large-scale optical system such as a laser Doppler vibrometer, it is possible to detect the interference component using a simple photoelectric conversion element. Therefore, the configuration of the optical microphone can be made small and simple.

Figure 13A:
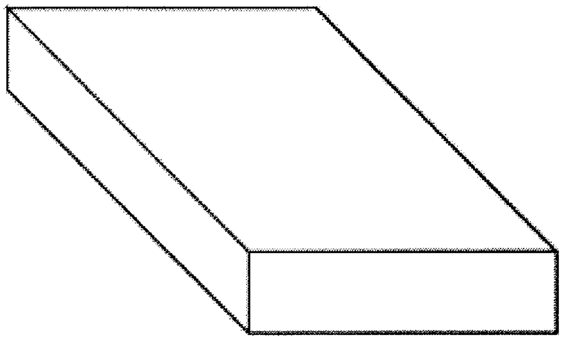
FIGS. 13A to 13C are diagrams schematically showing the shape of the propagation medium portion formed by a dry silica gel, and defects which may occur thereto.
Figure 13B:
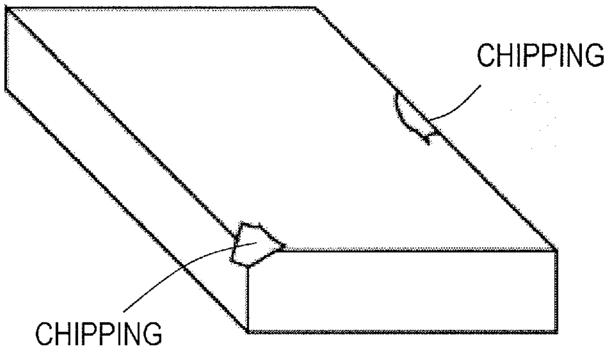
Figure 13C:
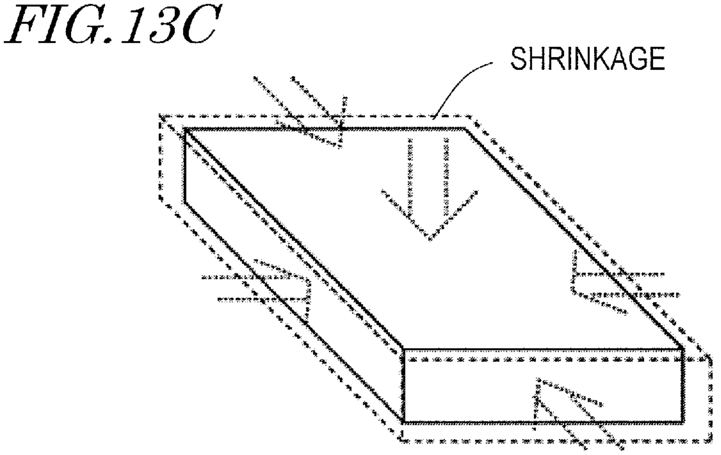

As described above, with the optical microphone of the present embodiment, it is possible to realize an optical microphone with a particularly high detection sensitivity when a dry silica gel is used as the propagation medium portion 7. However, the physical strength of a dry silica gel is weak, and therefore, in the propagation medium portion 7 designed to be rectangular as shown in FIG. 13A, chipping may occur at a corner or a ridge as shown in FIG. 13B or the entire propagation medium portion 7 may shrink beyond the design shape during the manufacture thereof as shown in FIG. 13C, for example. A research by the present inventors has revealed that if such chipping or shrinkage leaves a gap between the support portion and the propagation medium portion 7, a ghost may be generated by the diffraction or leaking waves of the acoustic wave 1, thereby influencing the detection of the acoustic wave 1.

Figure 14A:
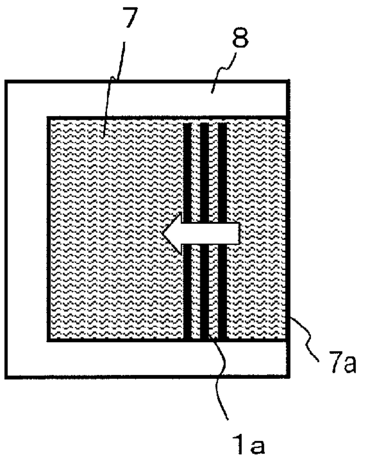
FIGS. 14A to 14D are diagrams each showing how the acoustic wave 1 propagates through the inside of an acoustic wave receiving section 2.
Figure 14B:
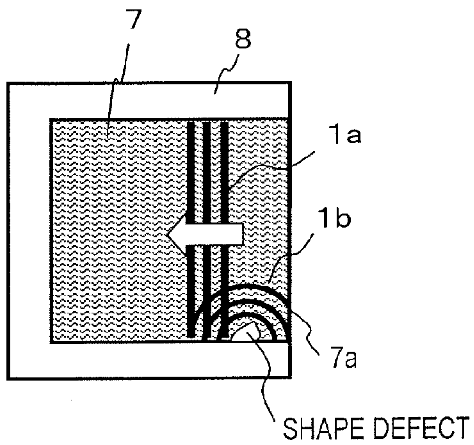
Figure 14C:
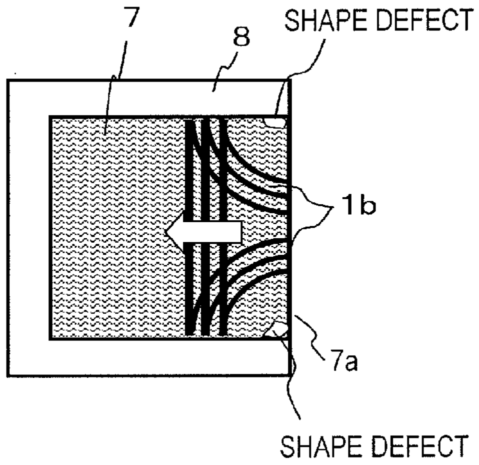
Figure 14D:
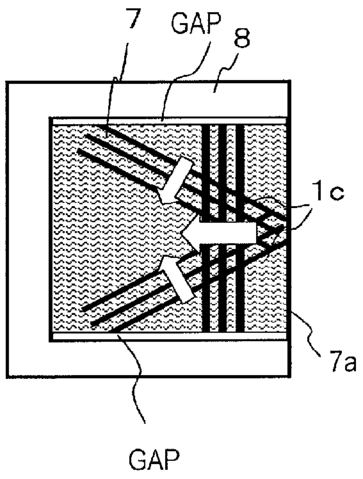

FIGS. 14A to 14D are x-y cross sections of the acoustic wave receiving section 2 of FIG. 1, showing how the acoustic wave 1, which is a plane wave propagating in a direction perpendicular to the incidence surface 7*a* of the propagation medium portion 7, enters the propagation medium portion 7 through the incidence surface 7*a* and propagates through the inside of the propagation medium portion 7. As shown in FIG. 14A, where there is no gap, or the like, produced by a shape defect such as chipping or shrinkage of the propagation medium portion 7, the acoustic wave 1 propagates through the propagation medium portion 7 while a main wave 1*a* thereof is dominant. In contrast, as shown in FIGS. 14B and 14C, where there is a shape defect such as chipping of the propagation medium portion 7, a spurious wave (ghost) 1*b* occurs originating from the portion of the shape defect. Where the propagation medium portion 7 has shrunk beyond the design shape thereof as shown in FIG. 14D, the acoustic wave 1 propagates through the space between the propagation medium portion 7 and the support portion 8, and the acoustic wave 1 propagating through this space enters the propagation medium portion 7 through the side surface of the propagation medium portion 7, thereby producing a spurious wave (ghost) 1*c*. Since these spurious waves 1*b* and 1*c* may have a time delay relative to the main wave 1*a* or may not be propagating while accurately reflecting the waveform of the acoustic wave 1, signals of these the spurious waves 1*b* and 1*c* are preferably not contained in the electric signal output from the photoelectric conversion section 5. A method for suppressing such spurious waves 1*b* and 1*c* will now be described.

As shown in FIGS. 14A to 14D, while the propagation direction of the main wave 1*a* is a direction perpendicular to the incidence surface 7*a* of the propagation medium portion 7, the spurious waves 1*b* and 1*c* do not propagate in the direction perpendicular to the incidence surface 7*a*. Thus, the spurious wave component contained in the electric signal output from the photoelectric conversion section 5 can be suppressed by reducing the influence of spurious waves of the acoustic wave 1 propagating in a direction non-perpendicular to the incidence surface 7*a*.

Spurious waves propagating in a direction non-perpendicular to the incidence surface 7*a* can be suppressed by arranging the light-blocking portion 6 or the photoelectric conversion section 5 for blocking the light wave 3. For example, where the incidence surface 7*a* of the propagation medium portion 7 is parallel to the yz plane as shown in FIG. 1, the light-blocking portion 6 is arranged so that the edge line 6*e* of the light-blocking portion 6 is parallel to the yz plane, i.e., parallel to the y axis. Since the acoustic wave 1 is incident perpendicular to the incidence surface 7*a*, the edge line 6*e* of the light-blocking portion 6 is perpendicular to the propagation direction of the acoustic wave 1 (the x axis).

FIGS. 15A to 15E schematically show arrangements of the $0^{th}$-order diffracted light wave 3*b*, the $+1^{st}$-order diffracted light wave 3*a* and the $-1^{st}$-order diffracted light wave 3*c* generated, where the edge line 6*e* of the light-blocking portion 6 and the propagation direction of the acoustic wave 1 form various angles, and show waveforms of the electric signal output from the photoelectric conversion section 5. The edge line 6*e* of the light-blocking portion 6 passes through the optical axis of the $0^{th}$-order diffracted light wave 3*b*.

As shown in FIGS. 15A to 15E, the $+1^{st}$-order diffracted light wave 3*a* and the $-1^{st}$-order diffracted light wave 3*c* are generated on the positive side and on the negative side, respectively, of the $0^{th}$-order diffracted light wave 3*b* with respect to the propagation direction of the acoustic wave 1. These diffracted light waves are of the main wave 1*a*. As the angle formed between the edge line 6*e* of the light-blocking portion 6 and the propagation direction of the acoustic wave 1 changes, the size of the portion of the area 3*d* over which the $0^{th}$-order diffracted light wave 3*b* and the $+1^{st}$-order diffracted light wave 3*a* overlap each other and the area 3*e* over which the $0^{th}$-order diffracted light wave 3*b* and the $-1^{st}$-order diffracted light wave 3*c* overlap each other to be blocked by the light-blocking portion 6 changes.

Figure 15A:
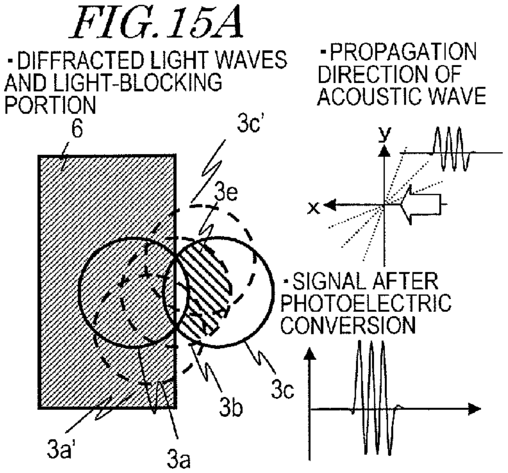
FIGS. 15A to 15E are diagrams each showing the propagation direction of the acoustic wave 1, diffracted light waves, and an electric signal obtained from the photoelectric conversion section, where the direction of the light-blocking portion is varied with respect to the propagation direction of the acoustic wave.

As shown in FIG. 15A, if the edge line 6*e* of the light-blocking portion 6 and the propagation direction of the acoustic wave 1 are perpendicular to each other, the area 3*d* over which the $0^{th}$-order diffracted light wave 3*b* and the $+1^{st}$-order diffracted light wave 3*a* overlap each other is completely blocked by the light-blocking portion 6, whereas the area 3*e* over which the $0^{th}$-order diffracted light wave 3*b* and the $-1^{st}$-order diffracted light wave 3*c* overlap each other is not blocked at all. Therefore, the interference light of the area 3*e* is not canceled out by the interference light of the area 3*d* having a different phase, and the amplitude of the detected signal of the main wave 1*a* of the acoustic wave 1 is maximized.

Figure 15B:
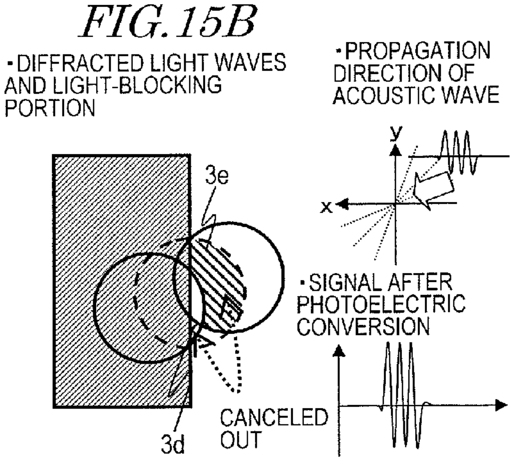
Figure 15C:
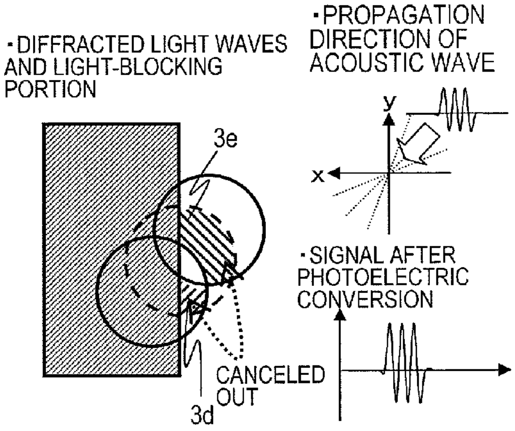
Figure 15D:
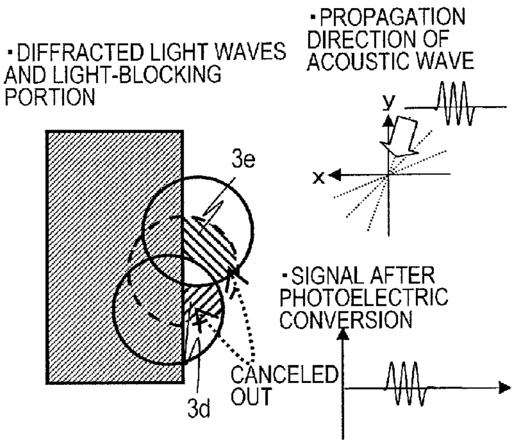

As shown in FIGS. 15B to 15D, where the edge line 6*e* of the light-blocking portion 6 and the propagation direction of the acoustic wave 1 are non-perpendicular to each other, a portion of the area 3*e* is blocked by the light-blocking portion 6 and a portion of the area 3*d* is not blocked by the light-blocking portion 6. Therefore, the amount of light of the interference light of the area 3*e* decreases, and the amount of light of the interference light of a reversed phase of the area 3*d* increases. Thus, the amplitude of the detected signal is small.

Figure 15E:
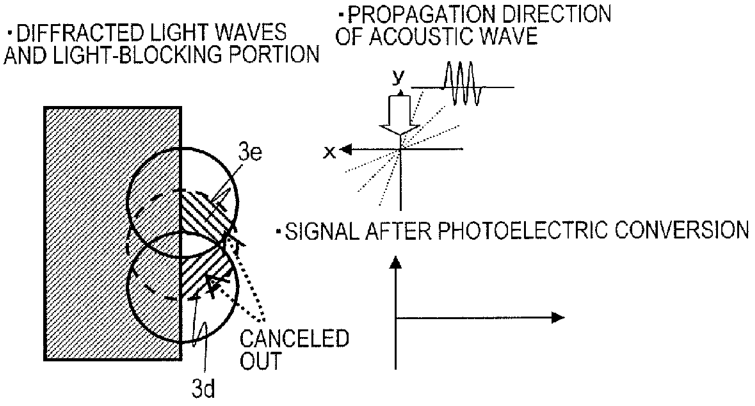

As shown in FIG. 15E, where the edge line 6*e* of the light-blocking portion 6 and the propagation direction of the acoustic wave 1 are parallel to each other, the area 3*e* and the area 3*d* have an equal area. Therefore, the amplitude of the signal of the main wave 1*a* of the acoustic wave 1 is zero.

In contrast, since the spurious waves 1*b* and 1*c* propagate in different directions from the propagation direction of the acoustic wave 1, if the edge line 6*e* of the light-blocking portion 6 and the propagation direction of the acoustic wave 1 are perpendicular to each other as shown in FIG. 15A, a $+1^{st}$-order diffracted light wave 3*a*' and a $-1^{st}$-order diffracted light wave 3*c*' of the spurious waves 1*b* and 1*c* occur in directions different from the propagation direction of the acoustic wave 1, i.e., the x-axis direction. Therefore, a portion of the area over which the $+1^{st}$-order diffracted light wave 3*a*' and the $0^{th}$-order diffracted light wave 3*b* of the spurious waves 1*b* and 1*c* overlap each other is not blocked by the light-blocking portion 6, and a portion of the area over which the $-1^{st}$-order diffracted light wave 3*c*' and the $0^{th}$-order diffracted light wave 3*b* overlap each other is blocked by the light-blocking portion 6. Thus, where the edge line 6*e* of the light-blocking portion 6 and the propagation direction of the acoustic wave 1 are perpendicular to each other, portions of two interference light of the spurious waves 1*b* and 1*c* are canceled out by each other, and the amplitude of the detected signal of the spurious wave is decreased from its maximum value.

Thus, where the edge line 6*e* of the light-blocking portion 6 and the propagation direction of the acoustic wave 1 are perpendicular to each other, the amplitude of the signal of the main wave 1*a* is maximized, and the amplitude of the signal of the spurious wave is suppressed. Therefore, components of the spurious waves 1*b* and 1*c* are suppressed in the electric signal output from the photoelectric conversion section 5.

Figure 16A:
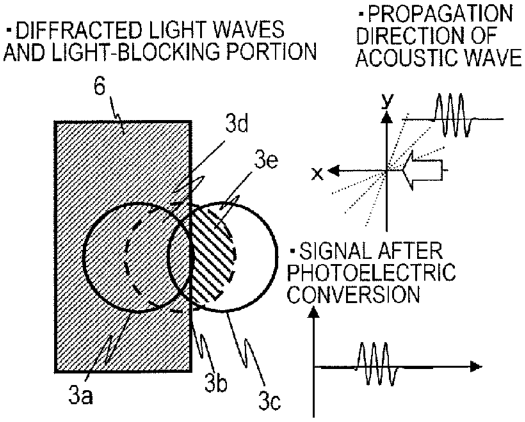
FIGS. 16A to 16E are other diagrams each showing the propagation direction of the acoustic wave 1, diffracted light waves, and an electric signal obtained from the photoelectric conversion section, where the direction of the light-blocking portion is varied with respect to the propagation direction of the acoustic wave.
Figure 16B:
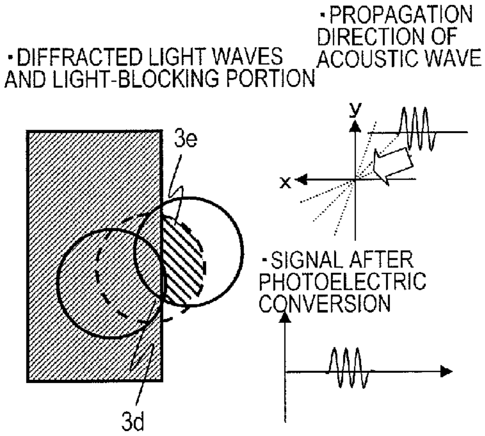
Figure 16C:
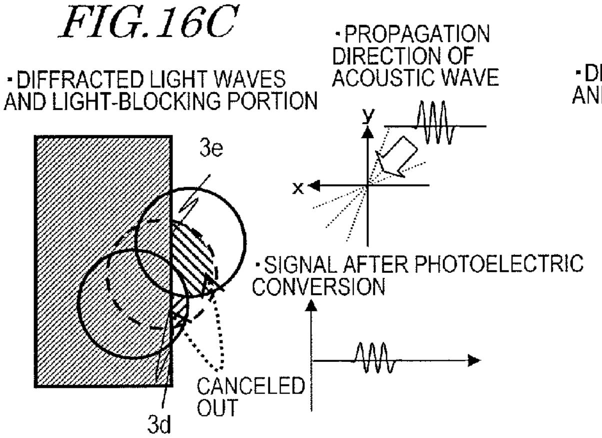
Figure 16D:
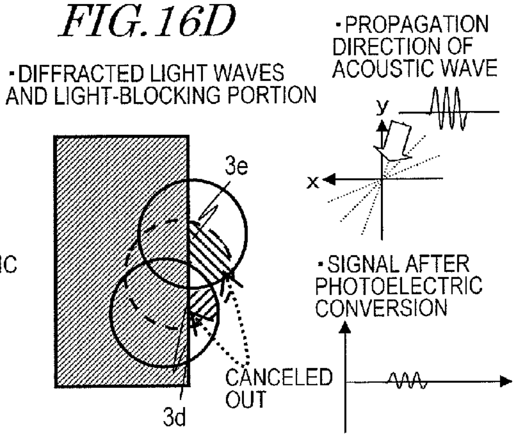
Figure 16E:
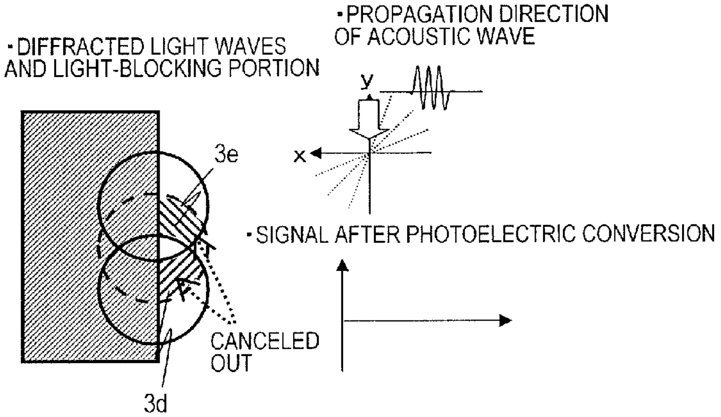

This similarly applies also to a case where the edge line 6*e* of the light-blocking portion 6 is off the optical axis of the $0^{th}$-order diffracted light wave 3*b*. As shown in FIGS. 16A to 16E, the amplitude of the signal of the main wave 1*a* of the acoustic wave 1 is maximized when the edge line 6*e* of the light-blocking portion 6 and the propagation direction of the acoustic wave 1 are perpendicular to each other (FIG. 16A), and is zero when the edge line 6*e* of the light-blocking portion 6 and the propagation direction of the acoustic wave 1 are parallel to each other (FIG. 16E). The influence of the spurious waves 1*b* and 1*c* is also suppressed when being perpendicular to the propagation direction of the acoustic wave 1 as described above.

Figure 17A:
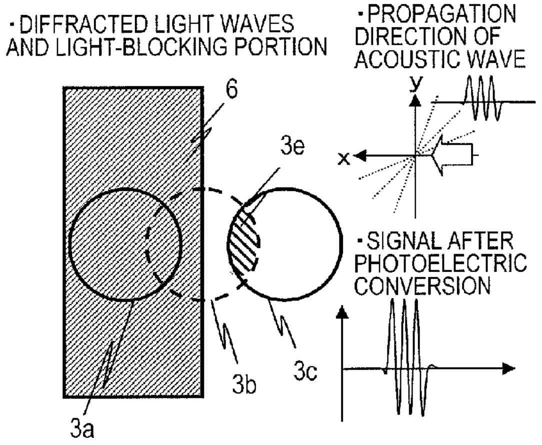
FIGS. 17A to 17E are other diagrams each showing the propagation direction of the acoustic wave 1, diffracted light waves, and an electric signal obtained from the photoelectric conversion section, where the direction of the light-blocking portion is varied with respect to the propagation direction of the acoustic wave.
Figure 17B:
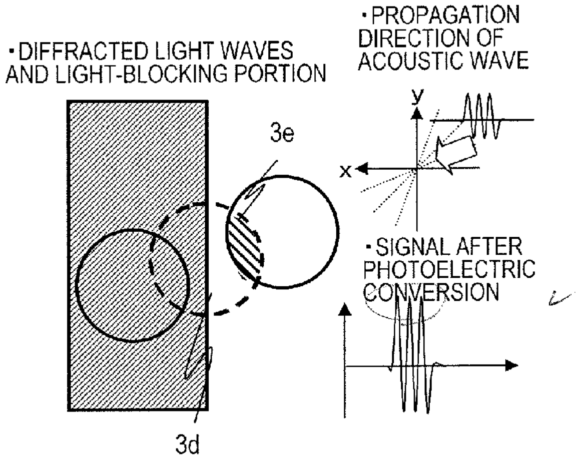
Figure 17C:
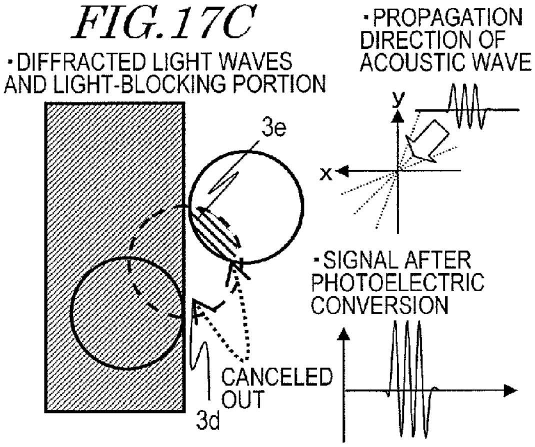
Figure 17D:
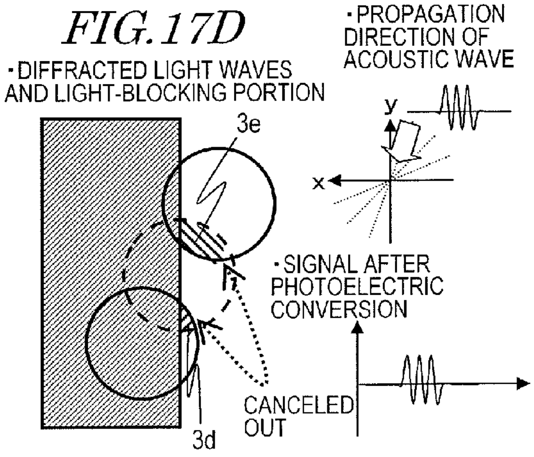
Figure 17E:
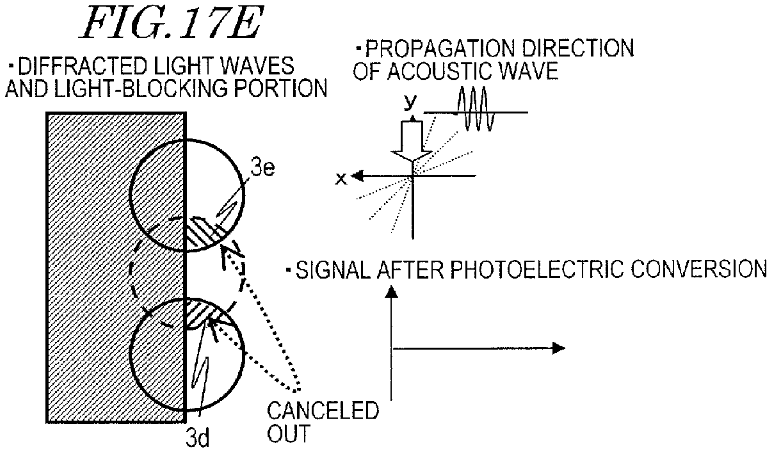

Similarly, also when the $+1^{st}$-order diffracted light wave 3*a* and the $-1^{st}$-order diffracted light wave 3*c* are separated from each other as shown in FIG. 10B, it is possible to increase the signal intensity of the main wave 1*a* of the acoustic wave 1 and to suppress the influence of the spurious waves 1*b* and 1*c*. Note however that the $+1^{st}$-order diffracted light wave 3*a* and the $-1^{st}$-order diffracted light wave 3*c* are separated from each other as shown in FIGS. 17A and 17B. Therefore, not only when the edge line 6*e* of the light-blocking portion 6 and the propagation direction of the acoustic wave 1 are perpendicular to each other (FIG. 17A) but also when the edge line 6*e* of the light-blocking portion forms an angle somewhat off the perpendicular direction with the propagation direction of the acoustic wave 1, the area over which the $+1^{st}$-order diffracted light wave 3*a* and the $0^{th}$-order diffracted light wave 3*b* overlap each other is blocked by the light-blocking portion 6, whereby the amplitude of the signal of the main wave 1*a* remains at its maximum value. Where the edge line 6*e* of the light-blocking portion 6 forms an angle significantly off the perpendicular direction with the propagation direction of the acoustic wave 1 as shown in FIGS. 17C and 17D, the amplitude of the signal of the main wave 1*a* decreases. Where the edge line 6*e* of the light-blocking portion 6 and the propagation direction of the acoustic wave 1 are parallel to each other as shown in FIG. 17E, the amplitude of the signal of the main wave 1*a* of the acoustic wave 1 is zero.

Figure 18A:
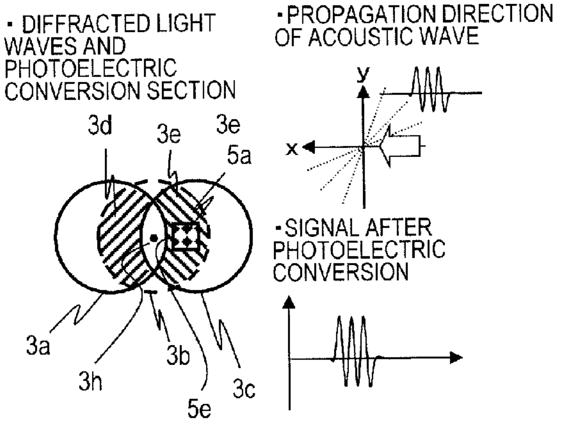
FIGS. 18A to 18E are diagrams each showing the propagation direction of the acoustic wave 1, diffracted light waves, and an electric signal obtained from the photoelectric conversion section, where the direction of the light-receiving surface of the photoelectric conversion section is varied with respect to the propagation direction of the acoustic wave.
Figure 18B:
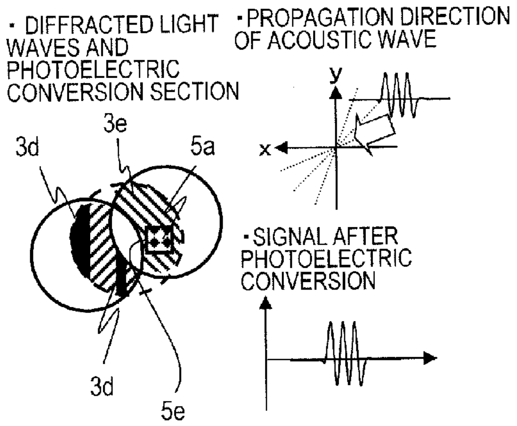
Figure 18C:
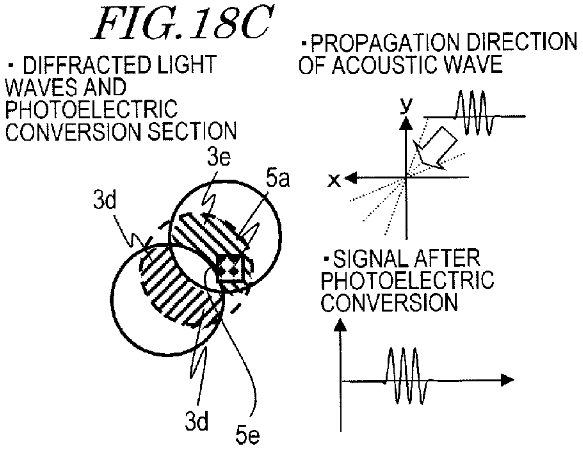
Figure 18D:
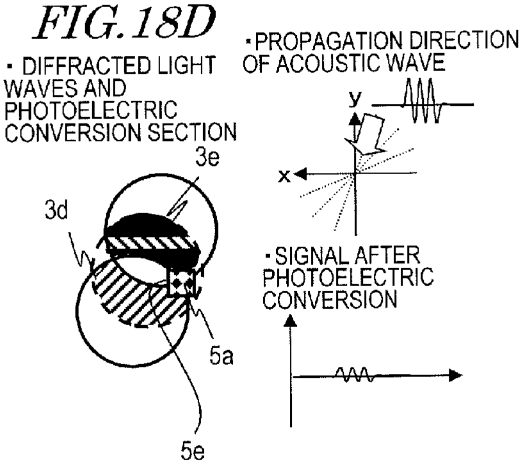
Figure 18E:
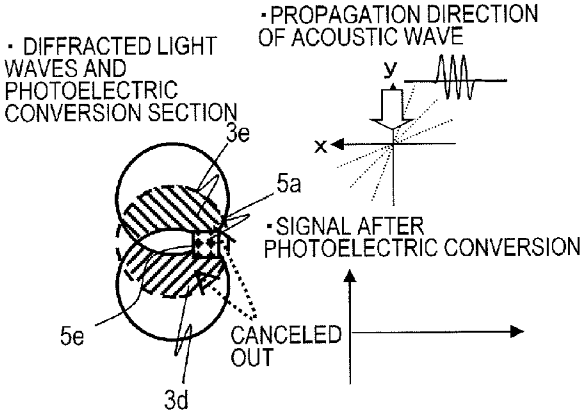
Figure 18F:
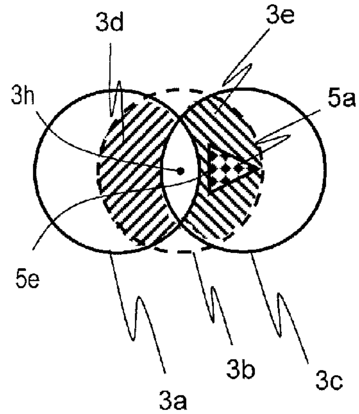
FIG. 18F is a diagram showing another example of a shape of the light-receiving surface of the photoelectric conversion section.

It is similarly possible to increase the signal intensity of the main wave 1*a* of the acoustic wave 1 and to suppress the influence of the spurious waves 1*b* and 1*c* also when the light-receiving surface 5*a* of the photoelectric conversion section 5 is shifted with respect to the optical axis of the $0^{th}$-order diffracted light wave 3*b*, instead of providing the light-blocking portion 6. As shown in FIGS. 18A to 18E, the amplitude of the signal of the main wave 1*a* of the acoustic wave 1 is maximized when one side 5*e* of the light-receiving surface 5*a* that is closest to the optical axis 3*h* of the $0^{th}$-order diffracted light wave 3*b* is perpendicular to the propagation direction of the acoustic wave 1 (FIG. 18A), and is zero when one side 5*e* of the light-receiving surface 5*a* is parallel to the propagation direction of the acoustic wave 1 (FIG. 18E). The influence of the spurious waves 1*b* and 1*c* is also suppressed when being perpendicular to the propagation direction of the acoustic wave 1 as described above (when the side 5*e* is parallel to the incidence surface). Note that while FIGS. 18A to 18E show a square shape as the shape of the light-receiving surface 5*a*, the shape of the light-receiving surface 5*a* does not need to be a square shape. For example, the light-receiving surface 5*a* may have a triangular shape as shown in FIG. 18F. The influence of the spurious waves 1*b* and 1*c* is suppressed if one of a plurality of sides defining the light-receiving surface 5*a* that is closest to the optical axis 3*h* of the $0^{th}$-order diffracted light wave 3*b* is perpendicular to the propagation direction of the acoustic wave 1.

Thus, with the optical microphone 101 of the present embodiment, it is possible to maximize the amplitude of the signal of the main wave of the acoustic wave and to suppress the influence of diffracted waves and leaking waves due to a shape defect of the propagation medium portion, thereby enabling detection of the acoustic wave with a desirable S/N, by arranging the edge line of the light-blocking portion or one side of the light-receiving surface of photoelectric conversion section to be vertical to the propagation direction of the acoustic wave, i.e., parallel to the incidence surface of the acoustic propagation portion. Particularly, when a change in the optical path length due to the acoustic wave 1 is detected by means of a laser Doppler vibrometer, or the like, a signal is detected which corresponds to the sound pressure of the acoustic wave 1, irrespective of the propagation direction of the acoustic wave 1, thereby detecting the diffracted wave 1*b* and the leaking wave 1*c*, as ghosts, in addition to the main wave 1*a*. In contrast, with the method described above, since the intensity of the obtained signal changes in accordance with the propagation direction of the acoustic wave 1, it is possible to detect the acoustic wave 1 while suppressing the intensity of the ghost signals 1*b* and 1*c* as compared with the intended signal of the main wave 1*a*.

(Experimental Result of Optical Microphone)

Figure 3:
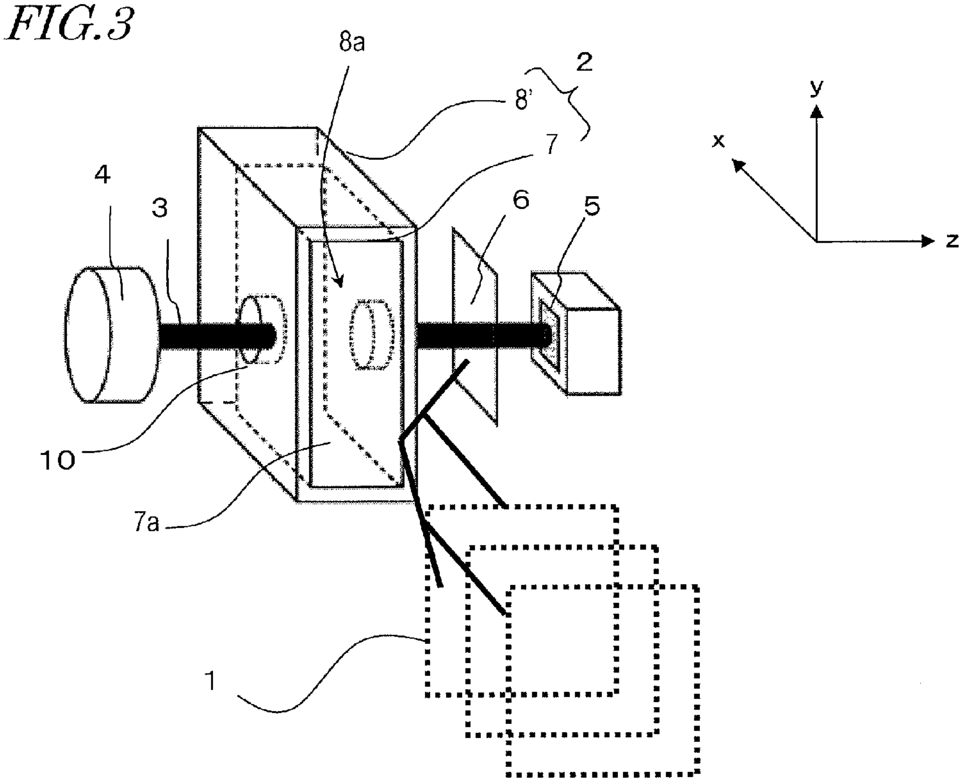
FIG. 3 is a diagram showing an example where a hole is provided in a support portion in a first embodiment.

A prototype optical microphone of the present embodiment shown in FIG. 3 was produced and the characteristics thereof were evaluated.

A dry silica gel having a density of 108 kg/m$^3$ and a sound speed of 51 m/sec was used as the propagation medium portion 7. The dry silica gel was produced by a sol-gel method. Specifically, a catalyst water was added to a sol liquid obtained by mixing tetramethoxysilane (TMOS) with a solvent such as ethanol, producing a wet gel through hydrolysis and a polycondensation reaction, and the obtained wet gel was subjected to a hydrophobic treatment. A mold having a rectangular parallelepiped inner space of 20 mm×20 mm×5 mm was filled with the wet gel, and the wet gel was dried by supercritical drying, thus obtaining the propagation medium portion 7 having a rectangular parallelepiped shape of 20 mm×20 mm×5 mm.

The support portion 8 was formed by using a transparent acrylic plate having a thickness of 3 mm. The support portion 8 had a rectangular parallelepiped inner space of 20 mm×20 mm×5 mm, and the opening 8*a* of 5 mm×20 mm, through which the acoustic wave 1 enters, and the hole 10, through which the light wave 3 enters and exits, were provided on the side surface.

An He—Ne laser having a wavelength of 633 nm was used as the light source 4. A photodetector of a silicon diode was used as the photoelectric conversion section 5. A blade of a box cutter was used as the light-blocking portion 6.

Figure 19:
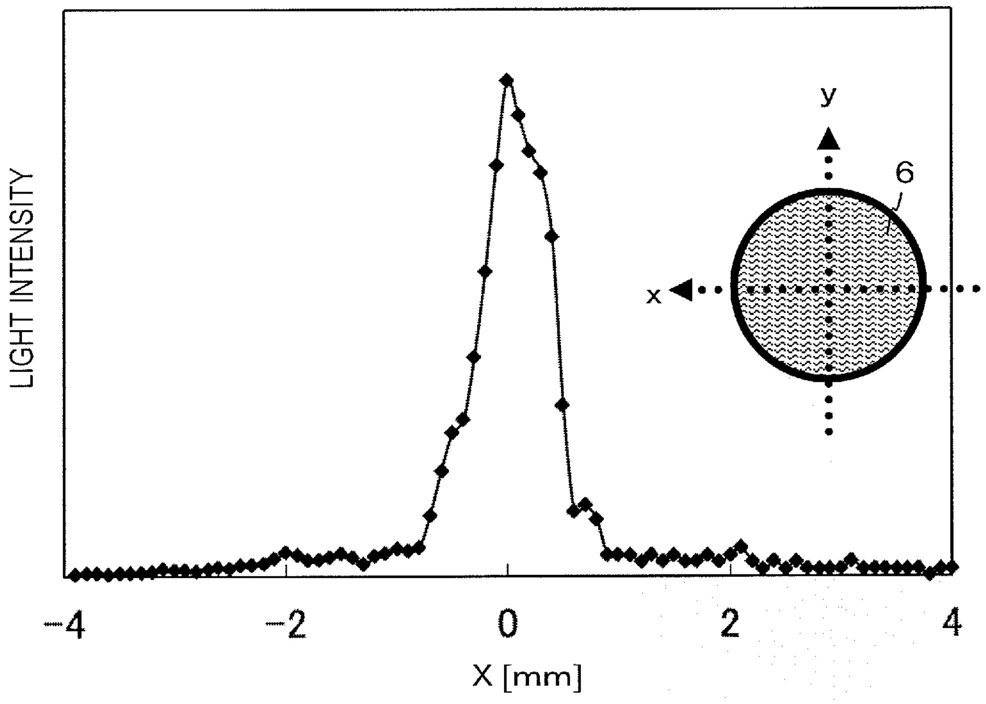
FIG. 19 is a graph showing measurement results of a light intensity distribution of the light wave 3 obtained with a produced prototype optical microphone.

First, the spot diameter of the light wave 3 was measured. The spot diameter was measured at a position where the light wave 3 has exited the acoustic wave receiving section 2 and propagated 25 cm toward the photoelectric conversion section 5. FIG. 19 shows the results of measuring, by a knife edge method, the intensity distribution of the light wave 3 in the x-axis direction. A knife blade was attached to a high precision stage to be perpendicular to the x axis, and the measurement was done by recording the position in the x direction and the intensity distribution of the light wave 3. The half-width of the peak representing the light intensity was obtained as the spot diameter. The spot diameter was about 0.6 mm. Note that while the value along the x axis is based on the center position of the $0^{th}$-order diffracted light wave 3*b* being 0, this position will be used as the zero point in the x axis in the following description.

The output of the photoelectric conversion section 5 was input to an oscilloscope, and the acoustic wave 1 was actually input to observe the waveform. A burst signal having a frequency of 40 kHz and composed of 15 sinusoidal wavelets was input to the tweeter so that the acoustic wave 1 is emitted into the air as the environmental fluid.

Figure 20:
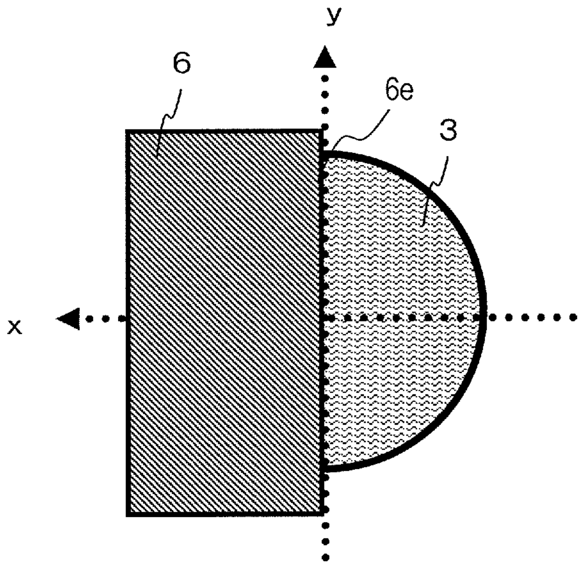
FIG. 20 is a diagram showing how the light wave 3 is blocked by the light-blocking portion 6 during the measurement with the produced prototype optical microphone.

As shown in FIG. 20, the light wave 3 was blocked by the light-blocking portion 6 at a position where the light wave 3 has exited the acoustic wave receiving section 2 and propagated 25 cm toward the photoelectric conversion section 5. The light-blocking portion 6 was fixed to a high precision stage so that the edge line 6*e* of the light-blocking portion 6 was parallel to the y axis, and an adjustment was made based on the intensity distribution measurement results shown in FIG. 19 so that the edge line 6*e* was located at the point x=0, which is the optical axis of the light wave 3. Thus, the light-blocking portion 6 only blocks a portion where x≥0, i.e., the light wave 3 that is located in the direction of the propagation direction of the acoustic wave 1 with respect to the center of the diffracted light wave 3*b*.

Figure 21:
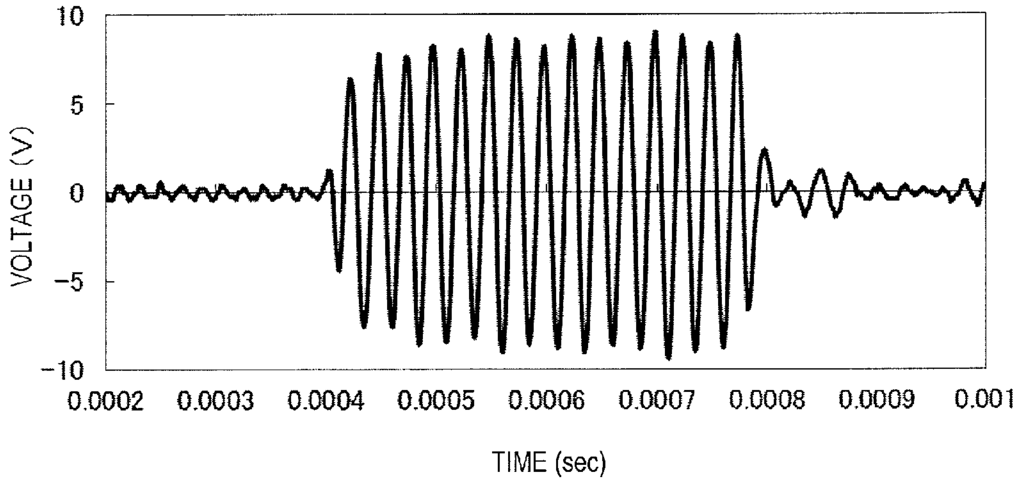
FIG. 21 is a graph showing the output wave of the produced prototype optical microphone.

FIG. 21 shows the results of observing the output waveform of the photoelectric conversion section 5 on an oscilloscope. Thus, it was confirmed that a waveform corresponding to the input acoustic wave 5 was obtained.

Figure 22:
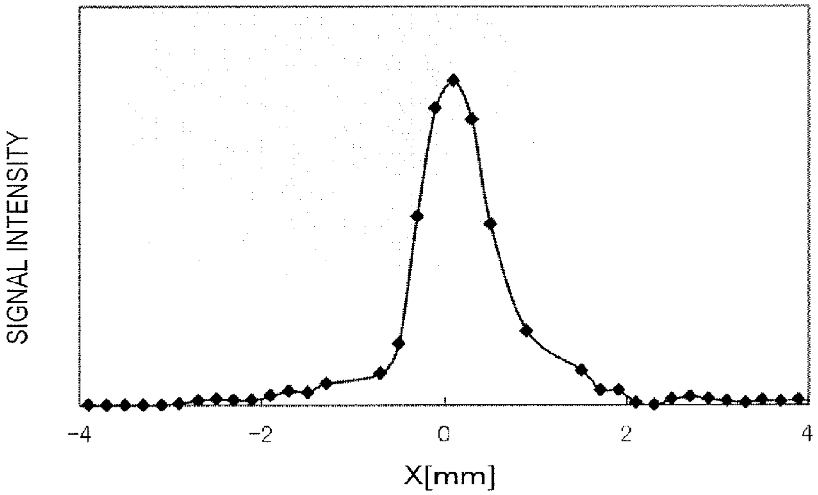
FIG. 22 is a graph showing the relationship between the position of the light-blocking portion 6 and the output amplitude of the optical microphone with the produced prototype optical microphone.

Next, the intensity of the output signal of the photoelectric conversion section 5 was measured while changing the position of the edge line 6*e* in the x-axis direction while keeping the edge line 6*e* of the light-blocking portion 6 parallel to the y axis. The results are shown in FIG. 22. It was confirmed from FIG. 22 that a strongest signal is obtained when the edge line of the light-blocking portion 6 is located at x=0, which is the center position of the diffracted light wave 3, and the signal intensity gradually weakens away from that position, failing to detect the signal when being significantly off the center.

Figure 23:
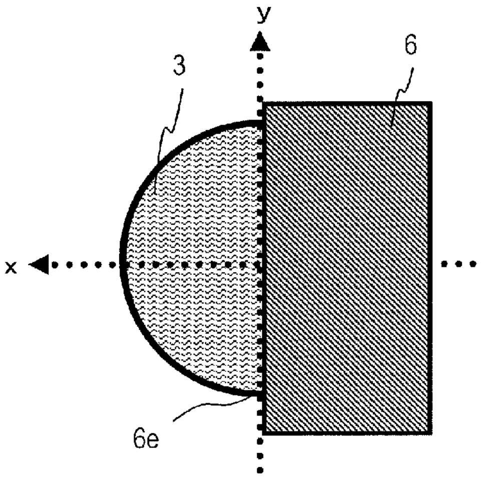
FIG. 23 is a diagram showing how the light wave 3 is blocked when the measurement is done while changing the blocking direction with the produced prototype optical microphone.
Figure 24:
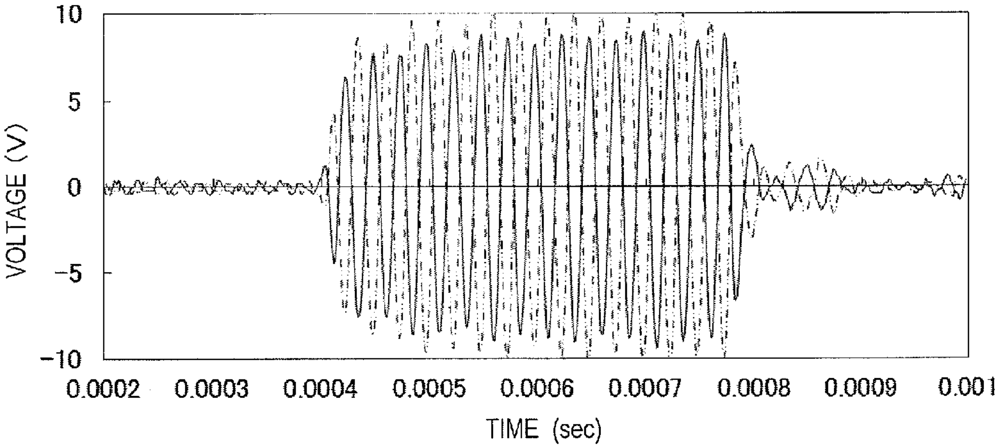
FIG. 24 is a graph showing the change of the output waveform caused by the change of the blocking direction with the produced prototype optical microphone.

Next, measurement was done while changing the position where the light wave 3 is blocked by the light-blocking portion 6. Only a portion where x≤0, i.e., a portion that is located in the opposite direction to the propagation direction of the acoustic wave 1 with respect to the center line of transmitted light 6*b*, was blocked, while keeping the edge line 6*e* of the light-blocking portion 6 parallel to the y axis, as shown in FIG. 23. Thus, the $-1^{st}$-order diffracted light 3*c* is blocked more than the $+1^{st}$-order diffracted light 3*a* is blocked. FIG. 24 shows waveforms before and after the arrangement was changed. In FIG. 24, a solid line represents the signal for the arrangement shown in FIG. 20, and a broken line represents the signal for the arrangement shown in FIG. 23. Thus, it was confirmed that the phases of two signals were reversed from each other.

Figure 25:
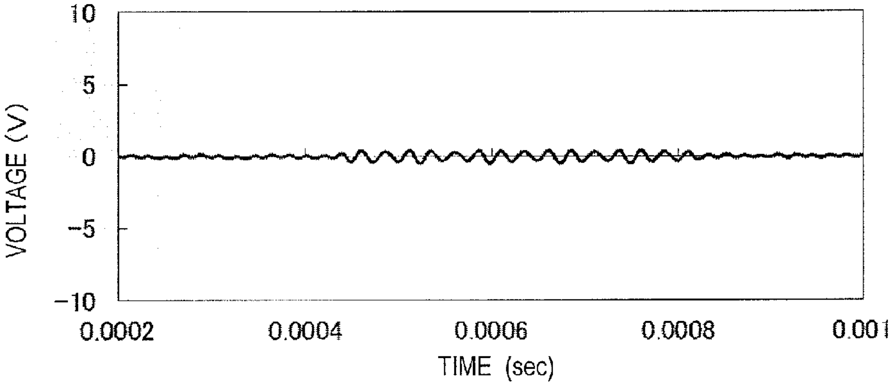
FIG. 25 is a graph showing the output waveform measured with the produced prototype optical microphone, with the light-blocking portion 6 removed.

Next, FIG. 25 shows the waveform of the signal obtained from the photoelectric conversion section 5, with the light-blocking portion 6 removed. Thus, it was confirmed that if the light-blocking portion 6 is removed, the two interference light of reversed phases are canceled out by each other, thereby failing to detect the acoustic wave 5 with a sufficient intensity.

Figure 26:
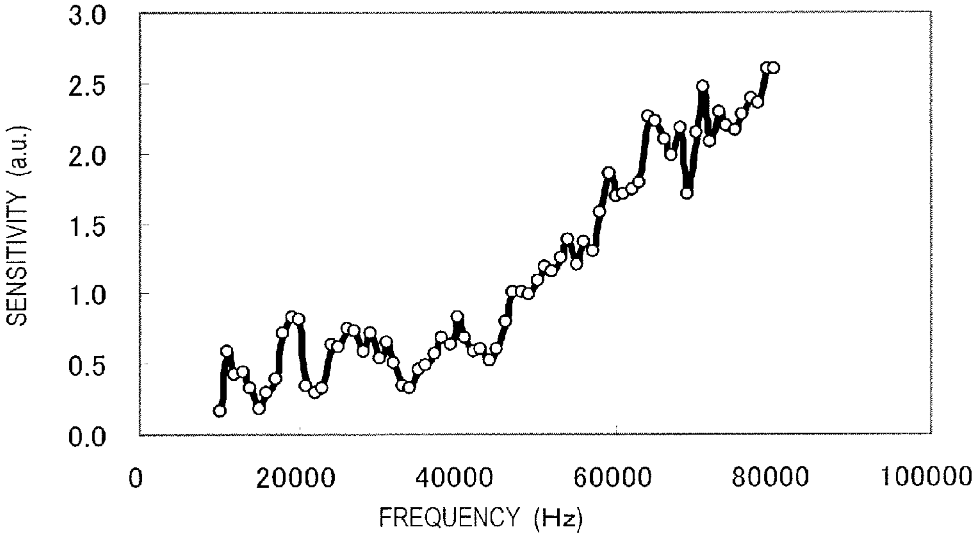
FIG. 26 is a graph showing the frequency characteristic of the produced prototype optical microphone.

As can be seen from Expression (3), the diffraction angle θ is dependent on the wavelength Λ of the acoustic wave 1. Therefore, the positions of the $+1^{st}$-order diffracted light wave 3*a* and the $-1^{st}$-order diffracted light wave 3*c* are dependent on the wavelength λ of the acoustic wave 1, and if the position of the light-blocking portion 6 is unchanged, the amount of light of the interference light detected by the photoelectric conversion section 5 changes as the positions of the $+1^{st}$-order diffracted light wave 3*a* and the $-1^{st}$-order diffracted light wave 3*c* change. That is, the detection sensitivity of the acoustic wave 1 is dependent on the frequency of the acoustic wave 1. FIG. 26 shows the frequency characteristic of a produced optical microphone. As can be seen from FIG. 26, the detection sensitivity tends to be higher as the frequency becomes higher.

Therefore, in order to obtain a flat band characteristic, the frequency characteristic of the electric signal obtained from the photoelectric conversion section 5 can be measured, and the electric signal can be corrected by using an inverse of the frequency of the electric signal, for example. As a simple correction method, for example, the electric signal can be corrected based on $1/f$, $1/f^2$ and $1/f^3$ of the frequency component f, i.e., the frequency of the electric signal to the power of −1, −2 or −3. The order to be used may be determined based on a frequency characteristic that is obtained by measuring the relationship between the frequency of the electric signal and the detection sensitivity in advance.

When prototype optical microphones of the present embodiment were produced, chipping might occur in the propagation medium portion 7 due to handling when the propagation medium portion 7 was arranged in the support portion 8, and the propagation medium portion 7 might shrink beyond the design value during the supercritical drying process when producing the propagation medium portion 7. With an optical microphone using such a propagation medium portion 7, there was a gap between the propagation medium portion 7 and the support portion 8.

Figure 27A:
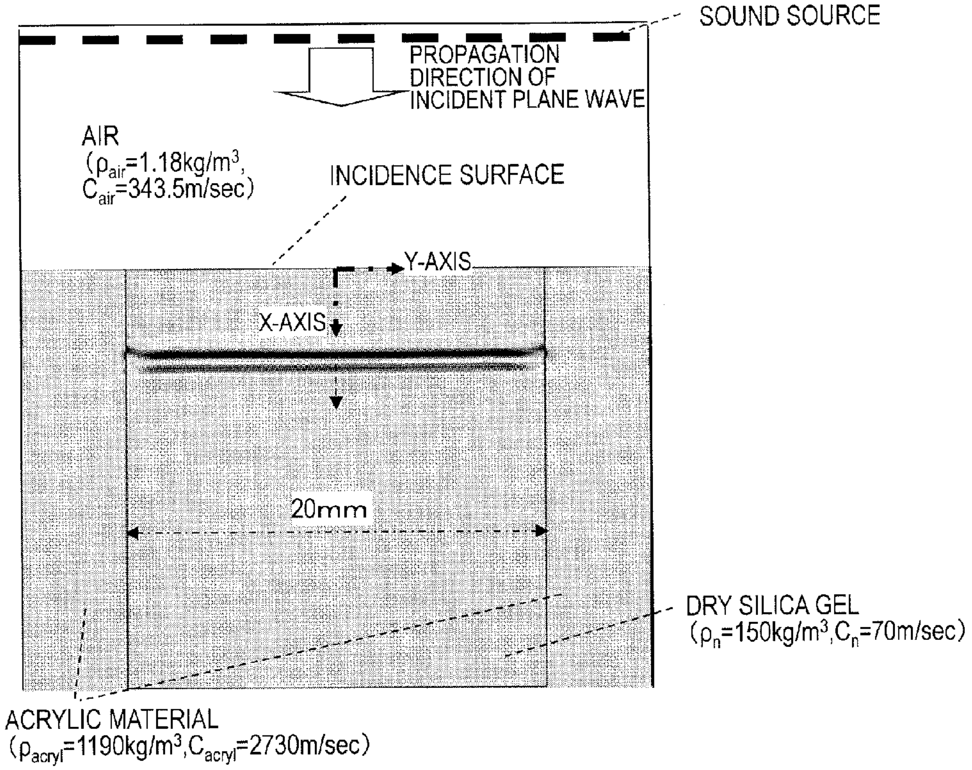
FIGS. 27A and 27B show simulation results of the propagation of the sound pressure through the air/dry silica gel interface.
Figure 27B:
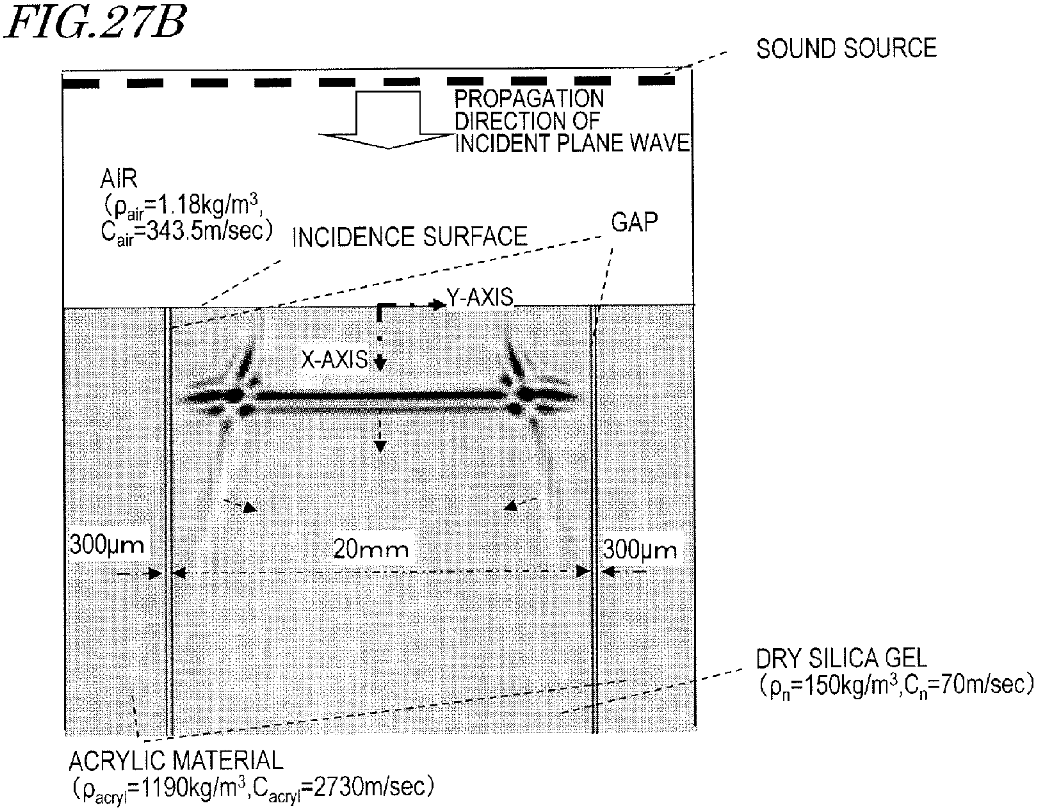
Figure 28:
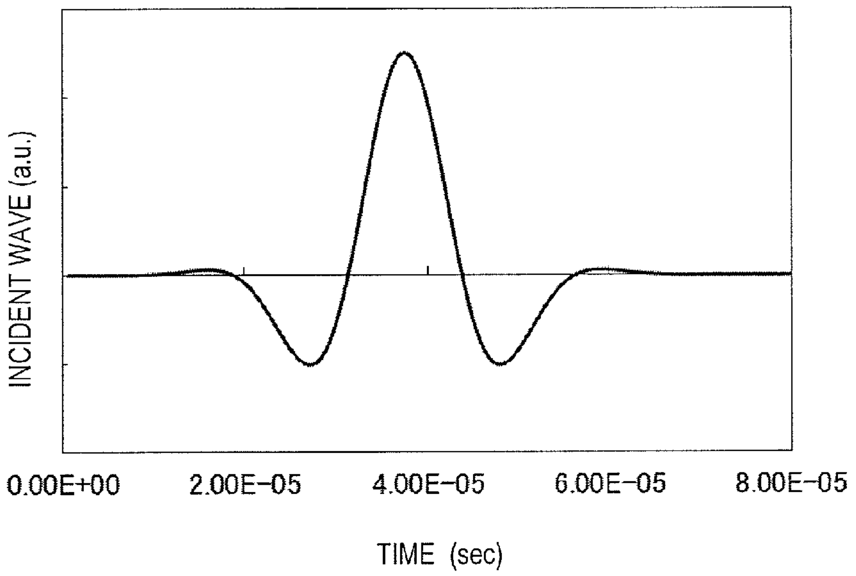
FIG. 28 is a graph showing the time waveform of the input acoustic wave.

It is believed that when there is a gap between the propagation medium portion 7 and the support portion 8, the acoustic wave 1 may leak into the gap, thereby detecting a spurious wave due to an unintended acoustic wave 1. FIGS. 27A and 27B show the results of simulating the propagation of the sound pressure when the acoustic wave 1 is taken into the propagation medium portion 7 in a case where there is a gap between the propagation medium portion 7 and the support portion 8 and in a case where there is no gap therebetween. As the acoustic wave 1, a plane wave of a wavelet waveform having a frequency of 40 kHz was made to be incident on the incidence surface of the propagation medium portion so that the propagation direction is perpendicular thereto, as shown in FIG. 28. A dry silica gel (density: 150 kg/m$^3$, sound speed: 70 m/sec) was used as the propagation medium portion 7, and the support portion 8 was formed by an acrylic material (density: 1190 kg/m$^3$, sound speed: 2730 m/sec). Hereinafter, in the propagation medium portion 7, the direction perpendicular to the incidence surface is defined as the X-axis direction and the direction parallel to the incidence surface as the Y-axis direction, and the center of the incidence surface in the y-axis direction is defined as the origin.

As shown in FIG. 27A, where there is no gap between the propagation medium portion 7 and the support portion 8, the sound pressure distribution of the acoustic wave having been taken in from inside the air propagates through the propagation medium portion 7 as a single plane wave propagating in the same direction as the input acoustic wave. In contrast, FIG. 27B shows the sound pressure propagation of the acoustic wave in a case where there is a gap of about 300 μm between the propagation medium portion 7 and the support portion 8, assuming a shrinkage of the dry silica gel, etc. As shown in FIG. 27B, a plane wave propagating in a direction different from that of the input acoustic wave can be seen in addition to a plane wave of the sound pressure distribution propagating in the same direction as the acoustic wave incident on the incidence surface. It is believed that this is due to an acoustic wave leaking in from the gap.

Figure 29:
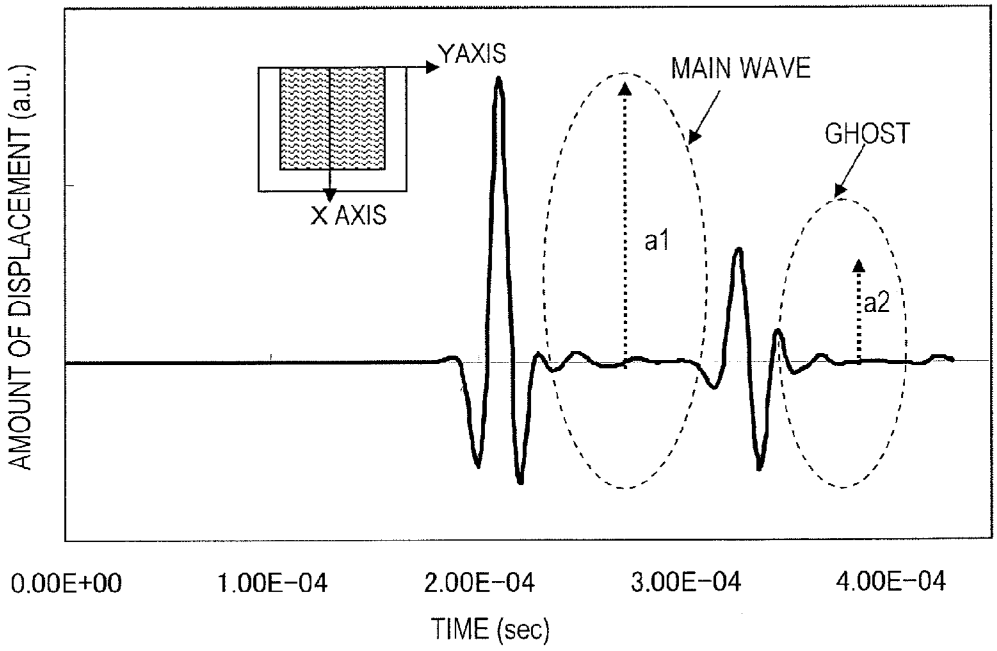
FIG. 29 is a graph showing the waveform of the amount of displacement at X=2, Y=0 of the dry silica gel.
Figure 30:
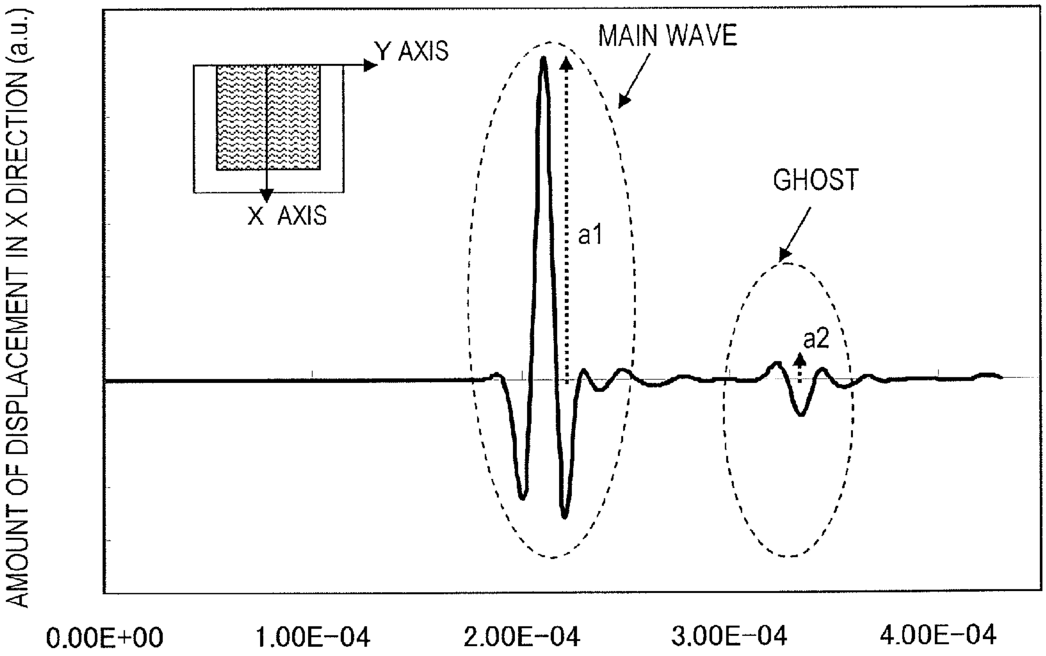
FIG. 30 is a graph showing the waveform of the amount of displacement in the X direction at X=2, Y=0 of the dry silica gel.
Figure 31A:
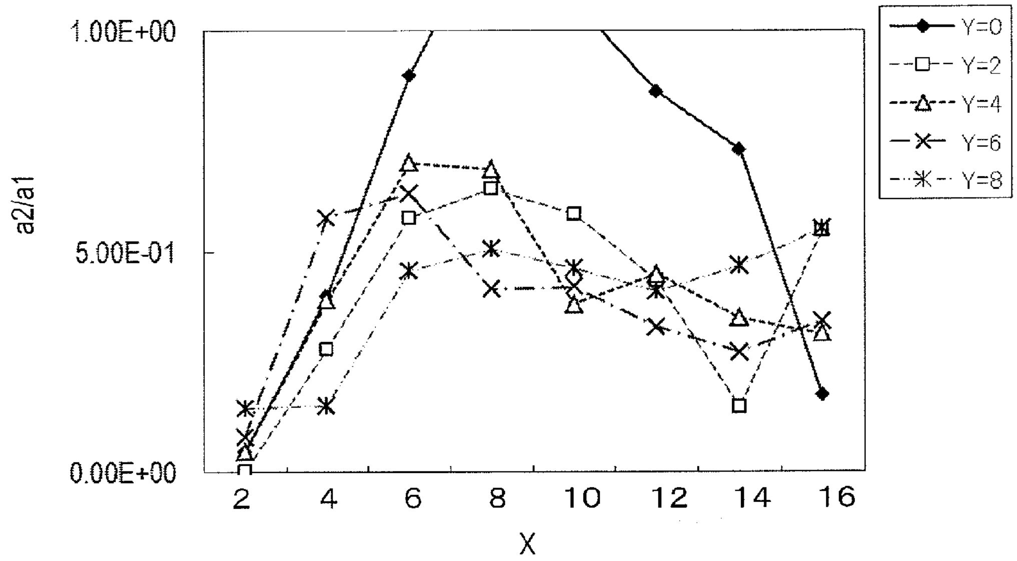
FIGS. 31A and 31B are graphs showing the calculation results of the main/spurious wave ratio.
Figure 31B:
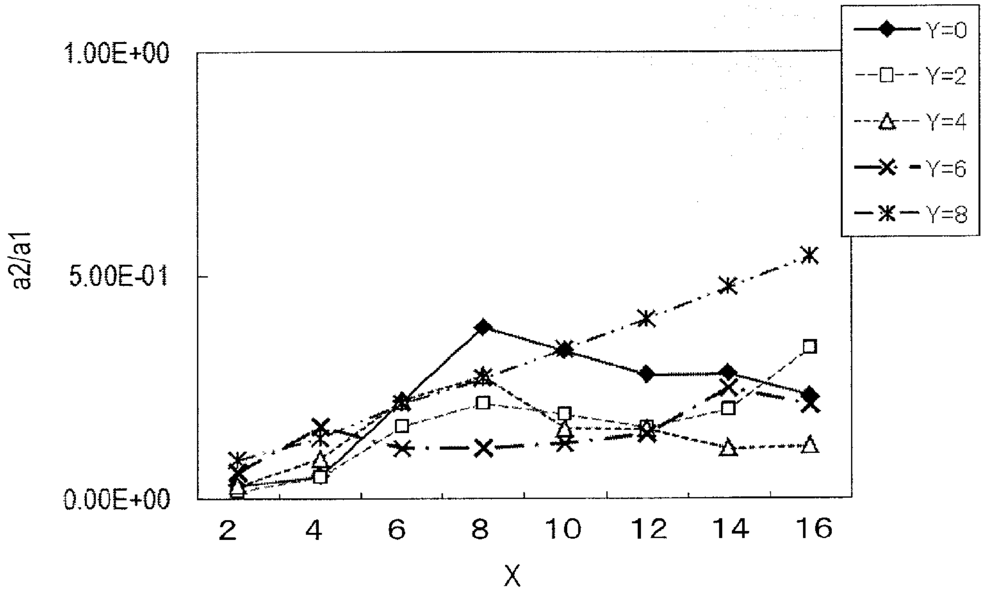

FIG. 29 shows a time waveform of the displacement due to the acoustic wave at a coordinate point X=2, Y=0. A spurious wave (ghost) propagating with a delay from the main wave was observed. While a spurious wave a2 is due to an acoustic wave leaking in from the gap, this is not an acoustic wave that is originally intended to be detected. Next, FIG. 30 shows the results of calculating the amount of displacement in the x direction at the same coordinate position. A comparison between FIG. 29 and FIG. 30 revealed that the spurious wave is significantly decreased when only the amount of displacement in the x direction is considered. FIG. 31 shows the results of calculating, for different coordinate points, the ratio between the amplitude a1 of the main wave and the amplitude a2 of the spurious wave. FIG. 31A shows the variation amount in every direction, and FIG. 31B only shows the variation amount in the x-axis direction. These figures indicate that the amplitude ratios obtained from only the amount of displacement in the x direction are decreased at most positions.

It can be seen from this that the spurious wave propagates in a direction different from that of the main wave. Therefore, it can be seen that it is possible to realize an optical microphone capable of suppressing the influence of spurious waves and detecting an acoustic wave with a high sensitivity, by arranging the light-blocking portion 6 so as to detect an acoustic wave with the highest sensitivity in the direction in which the main wave propagates, i.e., in the direction perpendicular to the incidence surface 7*a* which is the direction in which the acoustic wave enters the propagation medium portion 7, as described above in the present embodiment.

Second Embodiment

Figure 32:
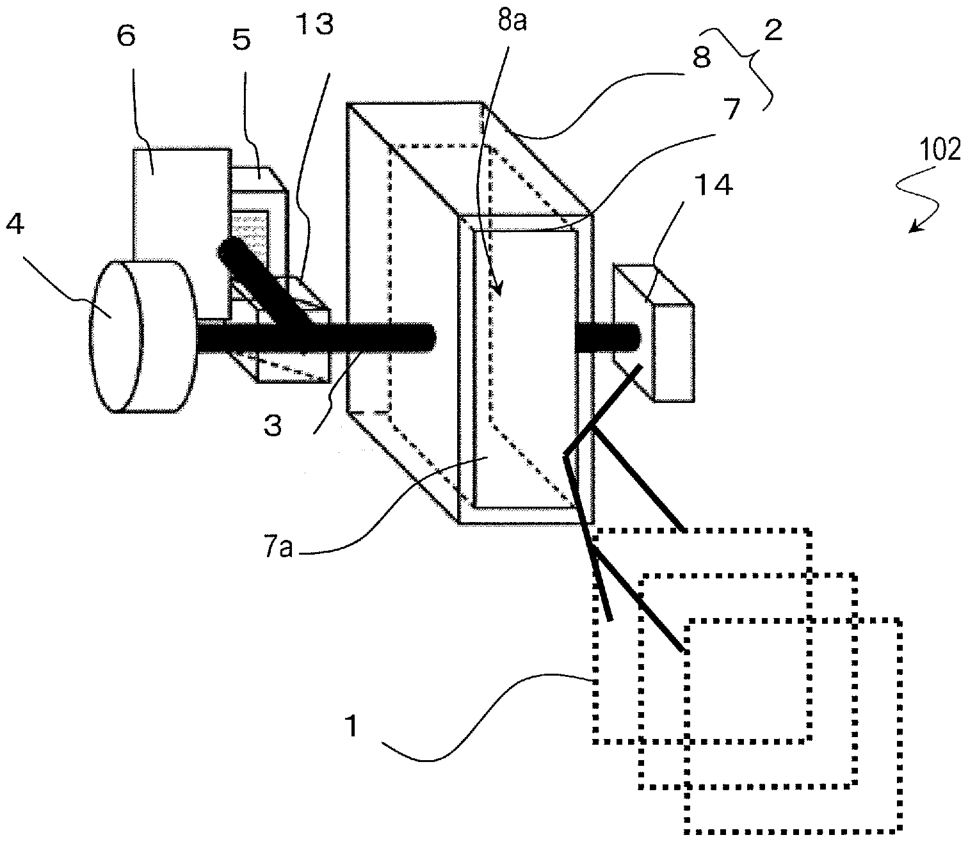
FIG. 32 is a schematic perspective view showing a second embodiment of an optical microphone according to the present invention.

A second embodiment of the optical microphone according to the present invention will now be described. FIG. 32 is a perspective view schematically showing a configuration of an optical microphone 102 of the second embodiment. The optical microphone 102 includes the acoustic wave receiving section 2, the light source 4, the photoelectric conversion section 5, the light-blocking portion 6, a beam splitter 13, and a mirror (reflection mirror) 14. The optical microphone 102 is different from the first embodiment in that the light wave 3 passes through the acoustic wave receiving section 2 twice by virtue of the mirror 14.

The beam splitter 13 is provided between the light source 4 and the acoustic wave receiving section 2, and the mirror 14 is provided on the opposite side from the light source 4 with respect to the acoustic wave receiving section 2. Thus, the acoustic wave receiving section 2 is located between the beam splitter 13 and the mirror 14. The mirror 14 may be provided in close contact with one surface of the acoustic wave receiving section 2 that is on the opposite side from the light source 4.

With the optical microphone 102, as in the first embodiment, the acoustic wave 1 propagating through the air is taken into the propagation medium portion 7 through the incidence surface 7*a*. The light wave 3 output from the light source 4 passes through the beam splitter 13 to enter the propagation medium portion 7 of the acoustic wave receiving section 2. In the propagation medium portion 7, the light wave 3 interacts with the acoustic wave 1 and exits the acoustic wave receiving section 2 to reach the mirror 14.

The light wave 3 is reflected by the mirror 14 to pass through the propagation medium portion 7 of the acoustic wave receiving section 2 again. Thus, the light wave 3 integrally interacts with the acoustic wave 1 over the outward path toward the mirror 14 and over the return path after the reflection by the mirror 14 as if it were passing through a propagation medium portion 7 whose effective length (FIG. 9) is twice as long. As a result, as it exits the propagation medium portion 7 toward the beam splitter 13, a $0^{th}$-order diffracted light wave, a $+1^{st}$-order diffracted light wave and a $-1^{st}$-order diffracted light wave are produced with a similar level of diffraction effect to that when it passes through a propagation medium portion having an effective length of 21. The light wave 3 containing these light waves enters the beam splitter 13 and is reflected by the half mirror of the beam splitter toward the photoelectric conversion section 5.

As in the first embodiment, the light wave 3 arriving at the photoelectric conversion section 5 includes three light waves, i.e., the $+1^{st}$-order diffracted light wave 3*a*, the $0^{th}$-order diffracted light wave 3*b* and the $-1^{st}$-order diffracted light wave 3*c*. Note however that the intensity of the $+1^{st}$-order diffracted light wave 3*a* and that of the −1st-order diffracted light wave 3*c* are twice as high as that of the diffracted light waves obtained when it passes through the propagation medium portion 7 once because 1 is doubled in Expression (4).

The method for detecting the light wave 3 by means of the photoelectric conversion section 5 using the light-blocking portion 6 is similar to that of the first embodiment. As described above in the first embodiment, the position of the photoelectric conversion section 5 may be shifted without using the light-blocking portion 6, or a first and a second optical fiber 11*a* and 11*b* or a horn 9 may be used.

With the optical microphone of the present embodiment, the light wave 3 is reflected by the mirror 14 so that it propagates through the propagation medium portion 7 twice, whereby the effective length is 21. Thus, a greater diffraction effect is obtained. Therefore, with an equal thickness of the propagation medium portion 7, it is possible to provide an optical microphone having a higher sensitivity than the first embodiment. The present embodiment can be suitably combined with the first embodiment or the third embodiment.

Third Embodiment

Figure 33:
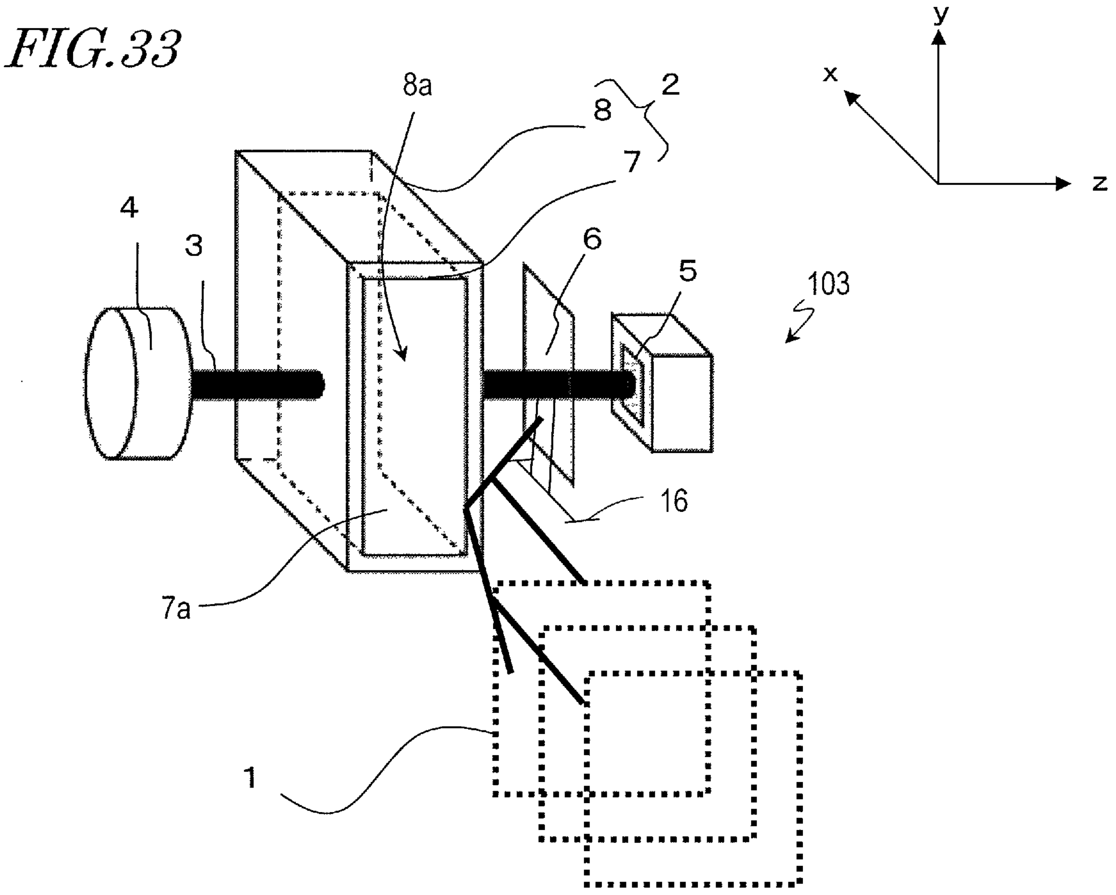
FIG. 33 is a schematic perspective view showing a third embodiment of an optical microphone according to the present invention.

A third embodiment of the optical microphone according to the present invention will now be described. FIG. 33 is a perspective view schematically showing a configuration of an optical microphone 103 of the third embodiment. The optical microphone 103 includes the acoustic wave receiving section 2, the light source 4, the photoelectric conversion section 5, the light-blocking portion 6, and a support portion (second support portion) 16 for supporting the light-blocking portion 6. The optical microphone 103 is different from the first embodiment in that it is possible to adjust the angle of the light-blocking portion 6 supported by the support portion 16.

Figure 34:
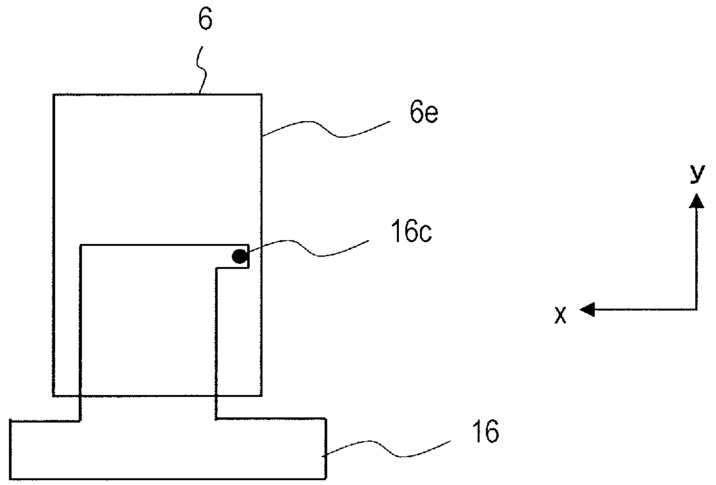
FIG. 34 is a diagram showing the light-blocking portion and the support portion in the second embodiment.

FIG. 34 is a schematic diagram of the light-blocking portion 6 supported by the support portion 16. The support portion 16 supports the light-blocking portion 6 rotatably within the xy plane about an axis 16*c*, and is capable of supporting the light-blocking portion 6 with the edge line 6*e* being at an arbitrary angle with respect to the y axis.

The optical microphone 103 is suitably used in cases where the propagation direction of the acoustic wave 1 is unknown. When the acoustic wave 1 is detected by using the optical microphone 103, first, the acoustic wave 1 is detected and the amplitude of the electric signal obtained from the photoelectric conversion section 5 is measured while changing the angle of the edge line 6*e* with respect to the y axis. Since the amplitude of the electric signal is maximized when the edge line 6*e* is perpendicular to the propagation direction of the acoustic wave as described above in the first embodiment, it is possible to detect the acoustic wave 1 with a high sensitivity by fixing the light-blocking portion 6 at such an angle of the edge line 6*e* that the amplitude of the electric signal is maximized. Then, the influence of spurious waves is suppressed for reasons described above in the first embodiment. Therefore, it is possible to detect an intended acoustic wave with a high sensitivity while suppressing the influence of spurious waves.

Figure 35:
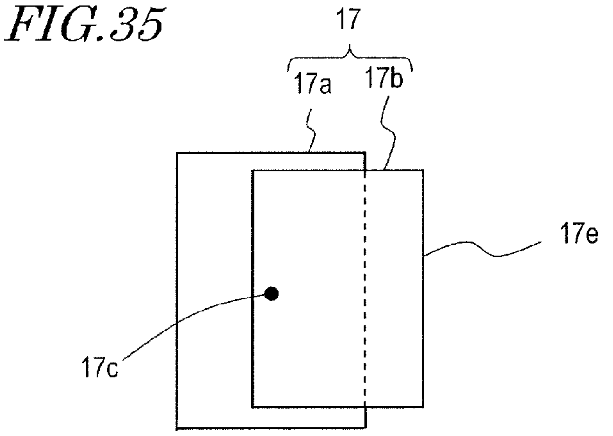
FIG. 35 is a diagram showing another embodiment of the light-blocking portion.
Figure 36:
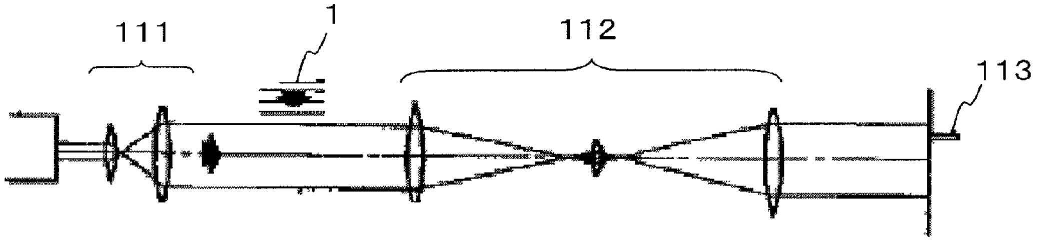
FIG.36 RELATED ART
FIG. 36 is a diagram showing a conventional optical microphone.
Figure 37:
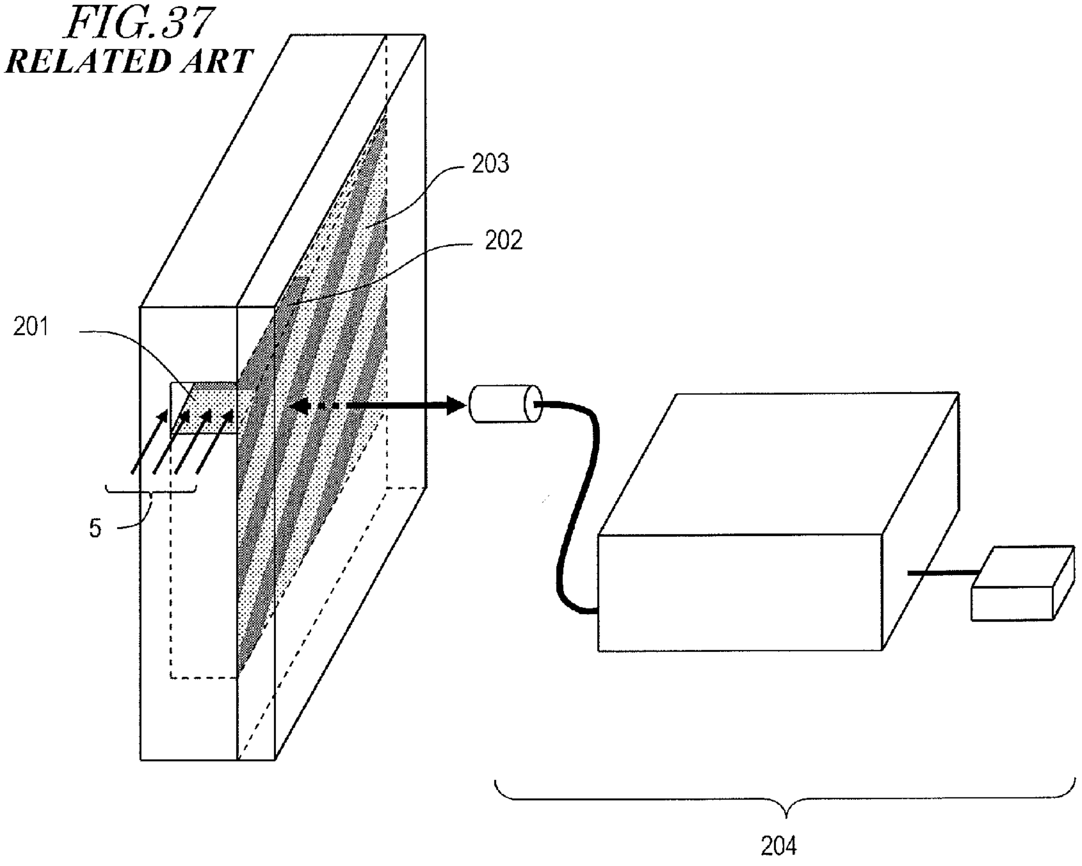
FIG.37 RELATED ART
FIG. 37 is a diagram showing another conventional optical microphone.

While the direction of the edge line 6*e* is adjusted by means of the support portion rotatably supporting the light-blocking portion 6 in the present embodiment, the blocking portion itself may be provided with this function. For example, a light-blocking portion 17 shown in FIG. 35 may be used instead of the light-blocking portion 6 and the support portion 16. The light-blocking portion 17 shown in FIG. 35 includes a base portion 17*a*, and a rotating portion 17*b* including an edge line 17*e*. The rotating portion 17*b* is supported rotatably about the axis 17*c* with respect to the base portion 17*a*, and the rotating portion 17*b* can be fixed at an arbitrary angle of rotation. Also with the light-blocking portion 17 having such a structure, it is possible to suppress the influence of spurious waves, and to detect an intended acoustic wave with a high sensitivity.

It is possible to employ a similar configuration also when suppressing the influence of spurious waves by shifting the light-receiving surface 5*a* of the photoelectric conversion section 5 with respect to the optical axis of the $0^{th}$-order diffracted light wave 3*b*, as described above in the first embodiment. Specifically, the sound wave 1 is detected and the electric signal is measured while rotating the side 5*e*, which is located between a portion to be incident on the light-receiving surface 5*a* and a portion to be not incident thereon, about the optical axis of the $0^{th}$-order diffracted light wave 3*b*. If an electric signal is obtained while fixing the position of the side 5*e* at such an angle that the electric signal is maximized, the influence of spurious waves on the obtained electric signal is best suppressed.

The optical microphone disclosed in the present application is applicable to small-sized ultrasonic wave sensors, audible sound microphones, etc. It is also applicable to ultrasonic wave receiving sensors for use in an ambient environment system using an ultrasonic wave.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical microphone for detecting an acoustic wave propagating through an environmental fluid by using a light wave, the optical microphone comprising:

an acoustic wave receiving section including a propagation medium portion and a first support portion, wherein the propagation medium portion is formed by a solid propagation medium, has an incidence surface through which the acoustic wave enters, and allows the acoustic wave having entered through the incidence surface to propagate therethrough, and the first support portion has an opening for the acoustic wave and supports the propagation medium portion so that the incidence surface is exposed through the opening;

a light source configured to output a light wave so that the light wave passes through the propagation medium portion across the acoustic wave propagating through the propagation medium portion;

a light-blocking portion having an edge line parallel to the incidence surface of the propagation medium portion for splitting the light wave having passed through the propagation medium portion into a blocked portion and a non-blocked portion; and a photoelectric conversion section configured to receive a portion of the light wave having passed through the propagation medium portion which has not been blocked by the light-blocking portion to output an electric signal, wherein:

a $+1^{st}$-order diffracted light wave and a $-1^{st}$-order diffracted light wave of the light wave are generated through the propagation medium portion due to a refractive index distribution of a propagation medium of the propagation medium portion caused by the propagation of the acoustic wave therethrough; and the photoelectric conversion section detects at least a portion of one of an area of a $0^{th}$-order diffracted light wave having passed through the propagation medium portion with no diffraction which overlaps the $+1^{st}$-order diffracted light wave and an area thereof which overlaps the $-1^{st}$-order diffracted light wave, or detects both of these areas with different amounts of light.

2. The optical microphone according to claim 1, wherein the edge line of the light-blocking portion crosses an optical axis of the light wave having passed through the propagation medium portion.

3. The optical microphone according to claim 1, further comprising a second support portion for supporting the light-blocking portion so that it is possible to adjust an angle formed between the edge line of the light-blocking portion and the incidence surface of the propagation medium portion.

4. An optical microphone for detecting an acoustic wave propagating through an environmental fluid by using a light wave, the optical microphone comprising:

an acoustic wave receiving section including a propagation medium portion and a first support portion, wherein the propagation medium portion is formed by a solid propagation medium, has an incidence surface through which the acoustic wave enters, and allows the acoustic wave having entered through the incidence surface to propagate therethrough, and the first support portion has an opening for the acoustic wave and supports the propagation medium portion so that the incidence surface is exposed through the opening;

a light source configured to output a light wave so that the light wave passes through the propagation medium portion across the acoustic wave propagating through the propagation medium portion; and a photoelectric conversion section having a light-receiving surface for receiving a portion of the light wave having passed through the propagation medium portion to output an electric signal, wherein the photoelectric conversion section defines at least a portion of the light-receiving surface and has a side, the side splitting the light wave having passed through the propagation medium portion into a portion to be incident on the light-receiving surface and a portion not to be incident thereon, the side being one which is closest to an optical axis of the light wave having passed through the propagation medium portion, and the side being parallel to the incidence surface of the propagation medium portion.

5. The optical microphone according to claim 1, wherein the first support portion has a pair of side walls sandwiching the propagation medium portion therebetween, the pair of side walls each having a hole for a light wave, the light wave entering the propagation medium portion through the hole of one of the pair of side walls and exiting through the hole of the other one of the pair of side walls.

6. The optical microphone according to claim 1, wherein a sound speed of an acoustic wave propagating through the propagation medium is less than a sound speed of an acoustic wave propagating through the air.

7. The optical microphone according to claim 1, wherein an acoustic impedance of the propagation medium is less than or equal to 100 times an acoustic impedance of the air.

8. The optical microphone according to claim 1, wherein the propagation medium is a dry silica gel.

9. The optical microphone according to claim 1, wherein the light wave is coherent light.

10. The optical microphone according to claim 1, wherein a wavelength of the light wave is 600 nm or more.

11. The optical microphone according to claim 1, further comprising at least one optical fiber, the at least one optical fiber being arranged between the light source and the light-receiving portion or between the light-receiving portion and the photoelectric conversion section.

12. The optical microphone according to claim 1, further comprising a horn provided in the opening.

13. The optical microphone according to claim 1, wherein:

the optical microphone further comprises a beam splitter and a mirror;

the beam splitter is located between the light source and the acoustic wave receiving section;

the acoustic wave receiving section is located between the beam splitter and the mirror;

a light wave output from the light source passes through the beam splitter and the propagation medium portion to be reflected by the mirror; and the light wave having been reflected by the mirror passes through the propagation medium portion again to be reflected by the beam splitter to enter the photoelectric conversion section.

14. The optical microphone according to claim 1, further comprising a signal processing section for receiving the electric signal from the photoelectric conversion section and correcting the electric signal based on a frequency of the electric signal to the power of −1, −2 or −3.

15. The optical microphone according to claim 1, further comprising a signal processing section for correcting the electric signal obtained from the photoelectric conversion section based on a pre-measured frequency characteristic.

16. A method for detecting an acoustic wave propagating through an environmental fluid by using a light wave, the method comprising:

allowing an acoustic wave to enter a propagation medium portion formed by a solid propagation medium through an incidence surface of the propagation medium portion so as to propagate through an inside thereof;

outputting a light wave from a light source to the propagation medium portion so as to pass through the propagation medium portion across the acoustic wave propagating through the propagation medium portion; and splitting a light wave having passed through the propagation medium portion into a blocked portion and a non-blocked portion by means of an edge line of a blocking portion parallel to the incidence surface so as to receive the non-blocked portion of the light wave by means of a photoelectric conversion section to convert the non-blocked portion to an electric signal, wherein:

a $+1^{st}$-order diffracted light wave and a $-1^{st}$-order diffracted light wave of the light wave are generated through the propagation medium portion due to a refractive index distribution of a propagation medium of the propagation medium portion caused by the propagation of the acoustic wave therethrough; and the photoelectric conversion section detects at least a portion of one of an area of a $0^{th}$-order diffracted light wave having passed through the propagation medium portion with no diffraction which overlaps the $+1^{st}$-order diffracted light wave and an area thereof which overlaps the $-1^{st}$-order diffracted light wave, or detects both of these areas with different amounts of light.

17. A method for detecting an acoustic wave according to claim 16, wherein the step of converting to an electric signal includes:

measuring the electric signal while rotating the edge line of the light-blocking portion, which is located between the blocked portion and the non-blocked portion of the light wave, about an optical axis of the light wave having passed through the propagation medium portion; and obtaining the electric signal by fixing a position of the edge line at such an angle that the electric signal is maximized.

18. A method for detecting an acoustic wave propagating through an environmental fluid by using a light wave, the method comprising:

allowing an acoustic wave to enter a propagation medium portion formed by a solid propagation medium through an incidence surface of the propagation medium portion so as to propagate through an inside thereof;

outputting a light wave from a light source to the propagation medium portion so as to pass through the propagation medium portion across the acoustic wave propagating through the propagation medium portion; and receiving a portion of the light wave having passed through the propagation medium portion by means of a photoelectric conversion section having a light-receiving surface to output an electric signal, wherein the photoelectric conversion section defines at least a portion of the light-receiving surface and has a side, the side splitting the light wave having passed through the propagation medium portion into a portion to be incident on the light-receiving surface and a portion not to be incident thereon, the side being one which is closest to an optical axis of the light wave having passed through the propagation medium portion, and the side being parallel to the incidence surface of the propagation medium portion.

19. A method for detecting an acoustic wave according to claim 18, wherein the step of converting to an electric signal includes:

measuring the electric signal while rotating a side, which is located between a portion to be incident on the light-receiving surface and a portion not to be incident thereon, about an optical axis of the light wave having passed through the propagation medium portion; and obtaining the electric signal by fixing a position of the side at such an angle that the electric signal is maximized.

* * * * *